(12) United States Patent
Emadzadeh et al.

(10) Patent No.: US 9,100,780 B2
(45) Date of Patent: Aug. 4, 2015

(54) METHOD AND APPARATUS FOR MANAGING POSITIONING ASSISTANCE DATA

(71) Applicant: QUALCOMM Incorporated, San Diego, CA (US)

(72) Inventors: Amir A. Emadzadeh, Campbell, CA (US); Sundar Raman, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 13/783,015

(22) Filed: Mar. 1, 2013

(65) Prior Publication Data

US 2014/0248899 A1    Sep. 4, 2014

(51) Int. Cl.
*H04W 24/00* (2009.01)
*H04W 4/02* (2009.01)
*G01S 5/02* (2010.01)
*H04W 64/00* (2009.01)

(52) U.S. Cl.
CPC ............... *H04W 4/02* (2013.01); *G01S 5/0236* (2013.01); *H04W 4/025* (2013.01); *H04W 64/00* (2013.01)

(58) Field of Classification Search
CPC ....... H04W 4/02; H04W 4/028; H04W 16/18; H04W 64/00; H04W 64/003; H04W 68/02; H04W 72/00; H04W 76/00; H04W 88/00; H04W 4/021; H04W 4/025; H04W 4/04
USPC .......... 455/456.1, 456.2, 456.3, 456.4, 456.5, 455/456.6
See application file for complete search history.

(56) References Cited

U.S. PATENT DOCUMENTS

| 6,718,237 | B1 | 4/2004 | Murray et al. |
| 8,040,219 | B2 | 10/2011 | Haartsen et al. |
| 8,145,237 | B2 | 3/2012 | Versteeg |
| 2008/0036756 | A1* | 2/2008 | Gaos et al. ..................... 345/418 |
| 2008/0176583 | A1 | 7/2008 | Brachet et al. |
| 2011/0039576 | A1* | 2/2011 | Prakash et al. ............. 455/456.1 |
| 2011/0159845 | A1* | 6/2011 | Sanjeev ........................ 455/411 |
| 2011/0190004 | A1 | 8/2011 | Tenny et al. |

(Continued)

FOREIGN PATENT DOCUMENTS

| EP | 1557062 A1 | 7/2005 |
| GB | 2419494 A | 4/2006 |

OTHER PUBLICATIONS

Partial International Search Report—PCT/US2014/017535—ISA/EPO—May 26, 2014, 5 pages.

(Continued)

*Primary Examiner* — Jean Gelin
(74) *Attorney, Agent, or Firm* — Hunter Clark PLLC

(57) ABSTRACT

Systems and methods for managing positioning assistance data for large regions are described herein. An example of a method for retrieving positioning assistance data at a mobile device as described herein includes identifying a master region in which the mobile device is located and sub-region definitions associated with the master region, where the sub-region definitions are indicative of area occupied by the sub-regions within the master region; obtaining a first estimated position of the mobile device within the master region; defining a projected area centered at the first estimated position; and obtaining first assistance data corresponding to at least one sub-region that overlaps the projected area.

45 Claims, 17 Drawing Sheets

(56) References Cited

U.S. PATENT DOCUMENTS

| | | | |
|---|---|---|---|
| 2012/0149369 A1* | 6/2012 | Lamba et al. | 455/433 |
| 2013/0016005 A1* | 1/2013 | Lindskog et al. | 342/357.25 |
| 2013/0190006 A1* | 7/2013 | Kazmi et al. | 455/456.1 |
| 2013/0203447 A1* | 8/2013 | Hannan et al. | 455/456.5 |
| 2013/0324154 A1* | 12/2013 | Raghupathy et al. | 455/456.1 |
| 2014/0099970 A1* | 4/2014 | Siomina et al. | 455/456.1 |

OTHER PUBLICATIONS

International Search Report and Written Opinion—PCT/US2014/017535—ISA/EPO—Jul. 15, 2014, 14 pages.

International Preliminary Report on Patentability—PCT/US2014/017535, The International Bureau of WIPO—Geneva, Switzerland, May 12, 2015, 26 pgs.

* cited by examiner

METHOD AND APPARATUS FOR MANAGING POSITIONING ASSISTANCE DATA

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various applications are utilized to obtain and utilized to locate the position of a wireless communication device. For instance, location based services (LBSs) leverage the location of an associated device to provide controls for one or more applications running on the device. Applications of LBS functionality implemented with respect to wireless communication devices include personal navigation, social networking, targeting of content (e.g., advertisements, search results, etc.), among others. For some positioning systems, such as indoor positioning systems, areas are defined in terms of regions or other units.

SUMMARY

An example of a method for managing positioning assistance data is described herein. The method includes obtaining assistance data relating to a master region, the assistance data including information relating to a set of nodes within the master region; determining whether either a total size of the assistance data exceeds a mobile device operating capacity or a total count of nodes in the set of nodes exceeds an upper-bound number of nodes; and in response to determining that either the total size of the assistance data exceeds the mobile device operating capacity or the total count of nodes in the set of nodes exceeds the upper-bound number of nodes, dividing the master region into a plurality of sub-regions according to one or more criteria.

Another example of a method for retrieving positioning assistance data at a mobile device is described herein. The method includes identifying a master region in which the mobile device is located and sub-region definitions associated with the master region, where the sub-region definitions are indicative of area occupied by the sub-regions within the master region; obtaining a first estimated position of the mobile device within the master region; defining a projected area centered at the first estimated position; and obtaining first assistance data corresponding to at least one sub-region that overlaps the projected area.

An example of an apparatus for managing positioning assistance data is described herein. The apparatus includes an assistance data management module configured to obtain assistance data relating to a master region, the assistance data including information relating to a set of nodes within the master region; a system analysis module communicatively coupled to the assistance data management module and configured to determine whether either a total size of the assistance data exceeds a mobile device operating capacity or a total count of nodes in the set of nodes exceeds an upper-bound number of nodes; and an assistance data division module communicatively coupled to the assistance data management module and the system analysis module and configured to divide the master region into a plurality of sub-regions according to one or more criteria in response to determining that either the total size of the assistance data exceeds the mobile device operating capacity or the total count of nodes in the set of nodes exceeds the upper-bound number of nodes.

An example of a mobile device configured to retrieve positioning assistance data is described herein. The mobile device includes a region manager configured to identify a master region in which the mobile device is located and sub-region definitions associated with the master region, where the sub-region definitions are indicative of area occupied by the sub-regions within the master region; an initial location estimate module configured to obtain a first estimated position of the mobile device within the master region; a horizon tile positioning module communicatively coupled to the initial location estimate module and configured to define a horizon tile including a first projected area centered at the first estimated position; and an assistance data retrieval module communicatively coupled to the horizon tile positioning module and the region manager and configured to obtain first assistance data corresponding to at least one sub-region that overlaps the horizon tile.

Another example of an apparatus for managing positioning assistance data is described herein. The apparatus includes means for obtaining assistance data relating to a master region, the assistance data including information relating to a set of nodes within the master region; means for determining whether either a total size of the assistance data exceeds a mobile device operating capacity or a total count of nodes in the set of nodes exceeds an upper-bound number of nodes; and means for dividing the master region into a plurality of sub-regions according to one or more criteria in response to determining that either the total size of the assistance data exceeds the mobile device operating capacity or the total count of nodes in the set of nodes exceeds the upper-bound number of nodes.

Another example of a mobile device configured to retrieve positioning assistance data is described herein. The mobile device includes means for identifying a master region in which the mobile device is located and sub-region definitions associated with the master region, where the sub-region definitions are indicative of area occupied by the sub-regions within the master region; means for obtaining a first estimated position of the mobile device within the master region; means for defining a horizon tile including a first projected area centered at the first estimated position; and means for obtaining first assistance data corresponding to at least one sub-region that overlaps the horizon tile.

An example of a computer program product as described herein resides on a processor-executable computer storage medium and includes processor-executable instructions configured to cause a processor to obtain assistance data relating to a master region, the assistance data including information relating to a set of nodes within the master region; determine whether either a total size of the assistance data exceeds a mobile device operating capacity or a total count of nodes in the set of nodes exceeds an upper-bound number of nodes; and in response to determining that either the total size of the assistance data exceeds the mobile device operating capacity or the total count of nodes in the set of nodes exceeds the upper-bound number of nodes, divide the master region into a plurality of sub-regions according to one or more criteria.

Another example of a computer program product as described herein resides on a processor-executable computer storage medium and includes processor-executable instructions configured to cause a processor to identify a master region in which a mobile device is located and sub-region definitions associated with the master region, where the sub-region definitions are indicative of area occupied by the sub-regions within the master region; obtain a first estimated position of the mobile device within the master region; define a projected area centered at the first estimated position; and obtain first assistance data corresponding to at least one sub-region that overlaps the projected area.

An example of an apparatus for managing positioning assistance data as described herein comprises a processor configured to obtain assistance data relating to a master region, the assistance data including information relating to a set of nodes within the master region, to determine whether either a total size of the assistance data exceeds a mobile device operating capacity or a total count of nodes in the set of nodes exceeds an upper-bound number of nodes, and to divide the master region into a plurality of sub-regions according to one or more criteria in response to determining that either the total size of the assistance data exceeds the mobile device operating capacity or the total count of nodes in the set of nodes exceeds the upper-bound number of nodes. The apparatus further includes a memory coupled to the processor and configured for storing data.

An example of an apparatus for retrieving positioning assistance data as described herein includes a processor configured to identify a master region in which the apparatus is located and sub-region definitions associated with the master region, wherein the sub-region definitions are indicative of area occupied by the sub-regions within the master region, to obtain a first estimated position of the apparatus within the master region, to define a projected area centered at the first estimated position, and to obtain first assistance data corresponding to at least one sub-region that overlaps the projected area. The apparatus further includes a memory coupled to the processor and configured for storing data.

Items and/or techniques described herein may provide one or more of the following capabilities, as well as other capabilities not mentioned. Positioning applications can be made more scalable, allowing their use on a wide range of devices with varying operating capabilities. Large areas, such as airports, can be handled more efficiently by mobile positioning applications by dividing the area into smaller sub-areas. The amount of assistance data utilized for positioning can be decreased in some instances, reducing network loading associated with requesting and obtaining the data and device storage usage associated with maintaining the data. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Described herein are systems and methods for management and retrieval of assistance data for regions defined within a positioning system. Location areas, such as indoor areas including floors of buildings, are defined within a positioning system as regions. These regions are referred to as indoor or outdoor regions and/or by other naming conventions. These areas may also be defined in one or more ways, such as via a location context identifier (LCI) or other means. Each region is defined by assistance data for the region, which may include, but is not limited to, the following: connectivity, utility and heatmap information corresponding to all nodes in the region; coordinates of one or more points (e.g., vertices, etc.) within the region, e.g., relative to a coordinate system defined with respect to the Earth (e.g., latitude/longitude/altitude, etc.), a coordinate system defined with respect to an area that includes the region; size or dimensions (e.g., length and width) of the region given by number of nodes; the media access control (MAC) addresses of the access points (APs) which have influence on the region (i.e., an AP list); etc. As used herein, a "node" refers to a given location within a region, such as an anchor point or any other defined location of interest within the region.

The amount of assistance data associated with a region grows in proportion to the size of the region. Large regions result in large amounts of assistance data, which may be difficult or impractical to process at devices with limited processing ability, memory and/or storage, such as mobile devices. Accordingly, techniques are described herein whereby large regions are handled by dividing a master region into several smaller sub-regions. These sub-regions are subsequently selectively loaded and utilized by a mobile device as it moves through the master region.

Figure 1:
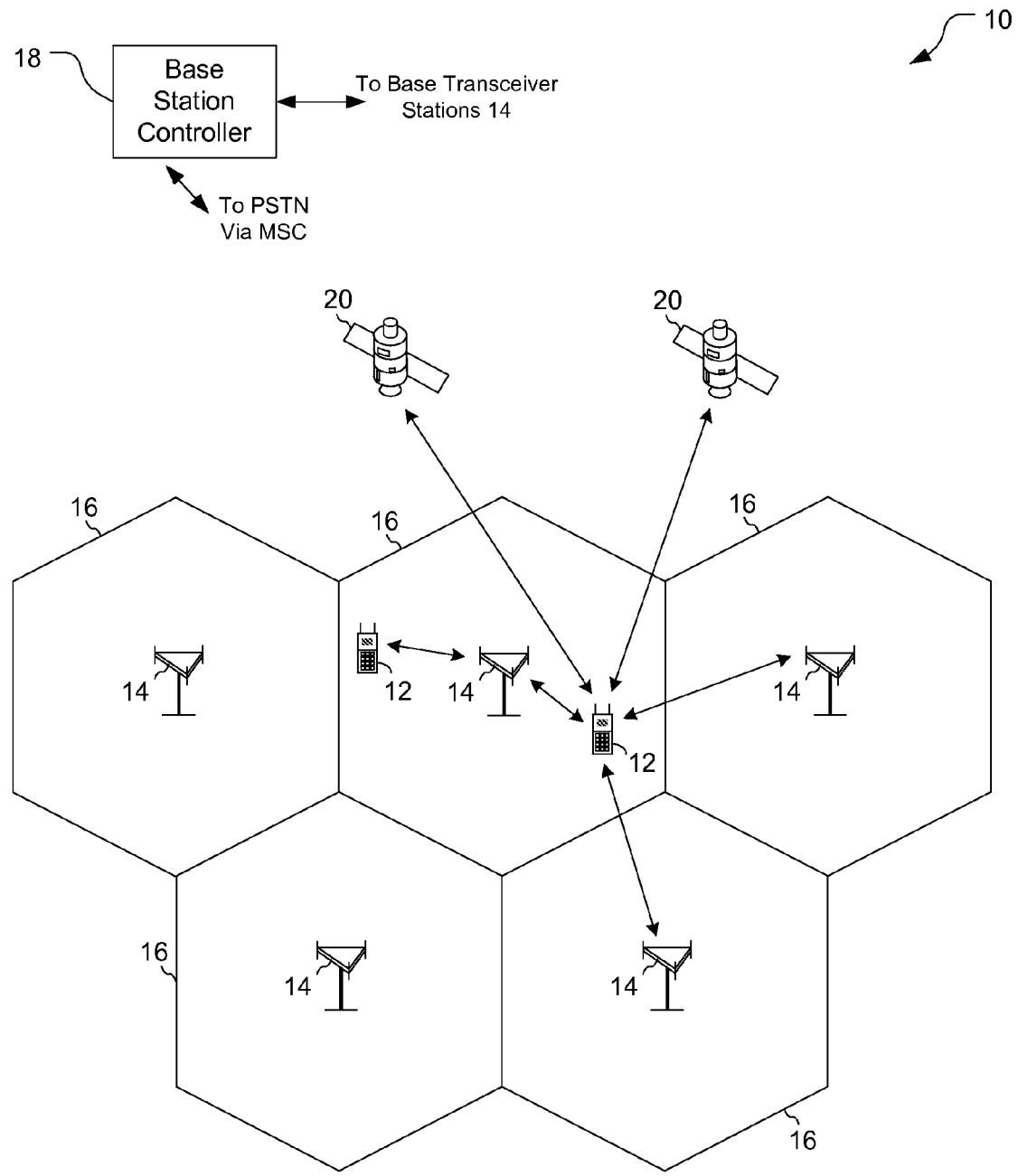
FIG. 1 is a schematic diagram of a wireless telecommunication system.

Systems and methods described herein operate via one or more mobile devices operating in a wireless communication system. Referring to FIG. 1, a wireless communication system 10 includes base transceiver stations (BTSs) 14 disposed in cells 16. The BTSs 14 provide communication service for a variety of wireless communication devices, referred to herein as mobile devices 12. Wireless communication devices served by a BTS 14 can include, but are not limited to, personal digital assistants (PDAs), smartphones, computing devices such as laptops, desktops or tablet computers, automobile computing systems, etc., whether presently existing or developed in the future.

The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single- Carrier Frequency Division Multiple Access (SC-FDMA) signal, etc. Each modulated signal may be sent on a different carrier and may carry pilot, overhead information, data, etc.

The BTS 14 can wirelessly communicate with the mobile devices 12 in the system 10 via antennas. A BTS 14 may also be referred to as a base station, an access point, an access node (AN), a Node B, an evolved Node B (eNB), etc. The BTS 14 is configured to communicate with mobile devices 12 via multiple carriers. The BTS 14 can provide communication coverage for a respective geographic area, here the cell 16. The cell 16 of the BTS 14 can be partitioned into multiple sectors as a function of the base station antennas.

The system 10 may include only macro base stations 14 or it can have base stations 14 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The mobile devices 12 can be dispersed throughout the cell 16. The mobile devices 12 may be referred to as terminals, access terminals (ATs), mobile stations, user equipment (UE), subscriber units, etc. The mobile devices 12 can include various devices as listed above and/or any other devices.

As further shown in FIG. 1, a mobile device 12 receives navigation signals from a satellite positioning system (SPS), e.g., through SPS satellites 20. The SPS satellites 20 can be associated with a single multiple global navigation satellite system (GNSS) or multiple such systems. A GNSS associated with satellites 20 can include, but are not limited to, Global Positioning System (GPS), Galileo, Glonass, Beidou (Compass), etc. SPS satellites 20 are also referred to as satellites, space vehicles (SVs), etc.

A mobile device 12 within the communication system 10 can estimate its current position within the communication system 10 using various techniques, based on other communication entities within view and/or information available to the mobile device 12. For instance, a mobile device 12 can estimate its position using information obtained from BTSs 14 and/or SPS satellites 20, as well as additional information as described in further detail below.

Figure 2:
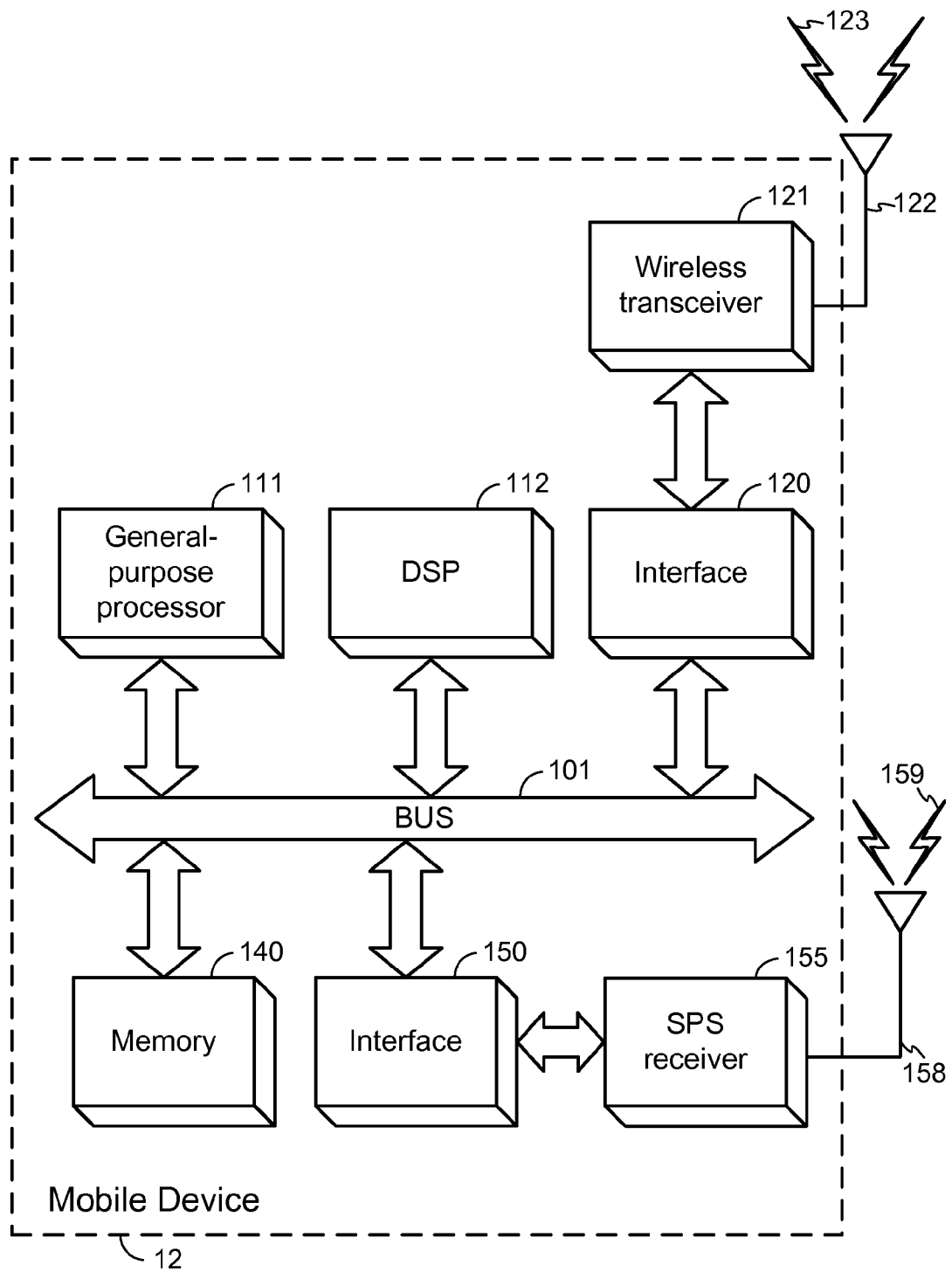
FIG. 2 is a block diagram of components of a mobile station shown in FIG. 1.

Referring next to FIG. 2, an example one of the mobile devices 12 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 2, the wireless transceiver bus interface 120 may also be a part of the wireless transceiver 121. Here, the mobile device 12 is illustrated as having a single wireless transceiver 121. However, a mobile device 12 can alternatively have multiple wireless transceivers 121 and wireless antennas 122 to support multiple communication standards such as WiFi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123 in whole or in part. Storage of information from the wireless signals 123 is performed using a memory 140 or registers (not shown). While only one general purpose processor 111, DSP 112 and memory 140 are shown in FIG. 2, more than one of any of these components could be used by the mobile device 12. The general purpose processor 111, DSP 112 and memory 140 are connected to the bus 101.

The mobile device 12 also includes an SPS receiver 155 that receives SPS signals 159 (e.g., from SPS satellites 20) via an SPS antenna 158. The SPS receiver 155 processes, in whole or in part, the SPS signals 159 and uses these SPS signals 159 to determine the location of the mobile device 12. The general-purpose processor 111, memory 140, DSP 112 and/or specialized processor(s) (not shown) may also be utilized to process the SPS signals 159, in whole or in part, and/or to calculate the location of the mobile device 12, in conjunction with SPS receiver 155. Storage of information from the SPS signals 159 or other location signals is performed using a memory 140 or registers (not shown).

The memory 140 includes a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory and/or a computer-readable memory that stores software 170 (programming code, instructions, etc.) configured to cause the processor 111 and/or DSP 112 to perform the functions described. Alternatively, one or more functions of the mobile device 12 may be performed in whole or in part in hardware.

Figure 3:
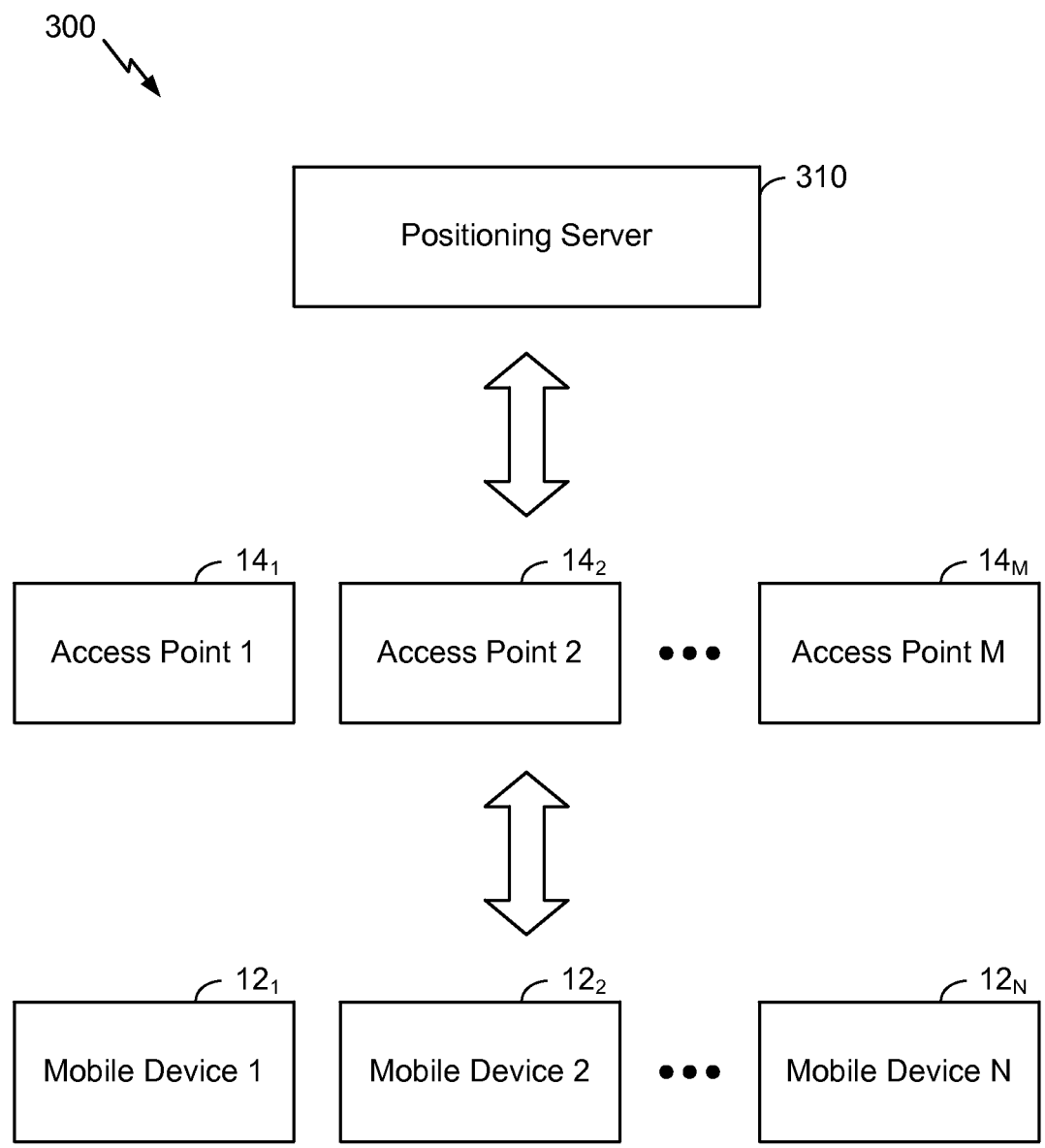
FIG. 3 is a generalized block diagram of a wireless communication network supporting position location.

As shown in FIG. 3, one or more mobile devices 12 and access points 14 as described above, together with a positioning server 310, are collectively used to implement a positioning system 300. As shown in FIG. 3 and described above, the mobile devices 12 and access points 14 communicate with each other, e.g., over a wireless medium. As further shown in FIG. 3, the access points 14 communicate with the positioning server 310, e.g., over a direct wired or wireless network connection and/or indirectly by way of one or more data networks or the Internet. While not shown in FIG. 3, the mobile devices 12 may also communicate with the positioning server 310, either directly or through the access points 14. Mobile devices 12 and access points may also communicate with each other (e.g., through peer-to-peer and backhaul connections, respectively).

The positioning server 310 maintains positioning assistance data (also referred to as simply "assistance data") for one or more regions. The positioning server 310 may be a local server that maintains data for only a single region or a small group of regions, or alternatively the positioning server 310 may maintain generalized information for many regions over a larger geographical area (e.g., a city, country, continent, etc.). While the positioning server 310 is shown in system 300 as an entity independent of other devices in the system 300, the positioning server 310 may also be implemented at least in part by one or more of the access points 14 and/or mobile devices 12.

As discussed above, the size of the assistance data associated with a region grows in proportion to the size of the region. For instance, the sizes of the connectivity graph, utility map and access map for a given region are a direct function of the size of the region. These components are typically defined for every node of the region and thereby grow as the region grows. Although the heatmap associated with a given region is restricted to an area around respective APs, the size of the heatmap will also increase as region size increases since the number of APs within a region is typically larger for a large region. For very large regions, such as airports or the like, these size increases present challenges to mobile devices in terms of memory usage and computational complexity. In order to avoid these bottlenecks, systems and methods presented herein constrain the size of the assistance data consumed by a mobile device to within the operating capabilities of the mobile device even for very large regions. To these ends, the positioning server 310 is configured to divide a master region into several smaller sub-regions. Further, a mobile device 12 is configured to define a horizon tile, which is a projected area centered at a predefined location within the master region, and only use assistance data corresponding to sub-regions overlapping the horizon tile. Each of these techniques is described in further detail below.

Figure 4:
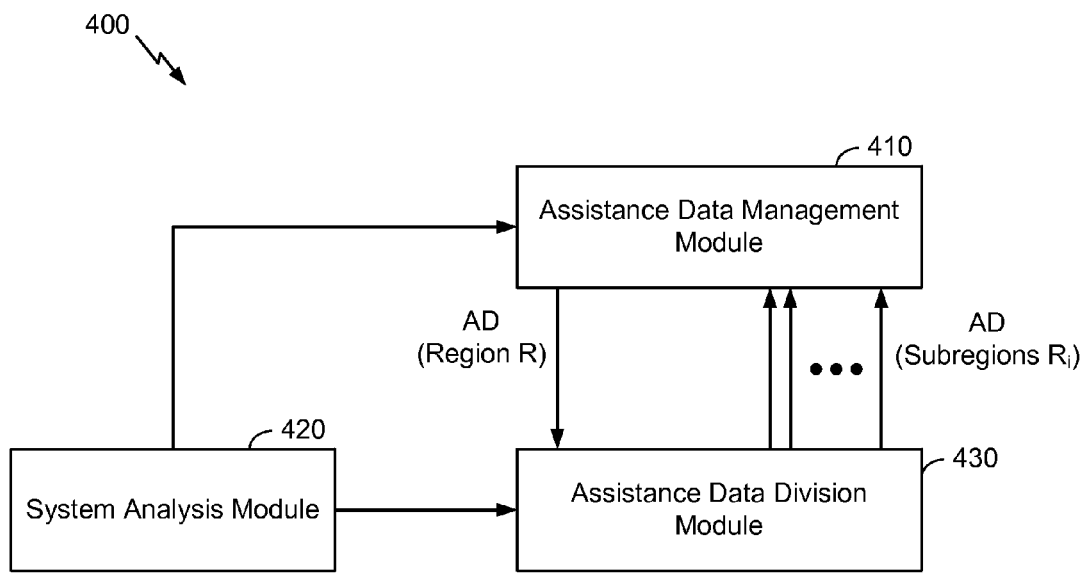
FIG. 4 is a block diagram of a system for managing positioning assistance data associated with a region.

Referring next to FIG. 4, a system 400 for managing assistance data associated with a region includes an assistance data management module 410, a system analysis module 420, and an assistance data division module 430. System 400 is implemented by, e.g., a positioning server 310 and/or any other device or entity that is configured to manage assistance data for a region.

The system 400 is configured to split an original "large" region into smaller sub-regions so that subsequently a device utilizing the assistance data will have the option to use the assistance data corresponding to the sub-regions. The system analysis module 420 analyzes one or more operating parameters of mobile devices 12 that utilize the assistance data associated with the assistance data management module 410 and/or an underlying communication network. These parameters may include, e.g., memory or storage capacity, network loading restrictions, or the like. If the system analysis module 420 compares the size of the assistance data associated with a given region as maintained by the assistance data management module 410 to determine whether the size of the assistance data exceeds a maximum size determined based on the identified operating parameters. If the size of the assistance data exceeds an upper-bound size, or the number of nodes exceeds an upper-bound number of nodes, an assistance data division module 430 divides the corresponding assistance data into sub-regions as described below. The assistance data for the sub-regions are then provided back to the assistance data management module 410 for subsequent processing.

As an example, the system analysis module 420 may determine an upper-bound assistance data size (e.g., 4 megabytes (MB), etc.) corresponding to a maximum amount of memory that can be utilized by a mobile device 12 for assistance data, and/or based on other criteria. Similarly, the system analysis module 420 may determine an upper-bound number of nodes based on a maximum number of nodes for which corresponding assistance data can be stored in memory at a mobile device 12 (e.g., 100,000 nodes), and/or based on other criteria. Thus, if the assistance data for a region is larger than the defined maximum size, or if the number of nodes exceeds the defined node limit, a tiling algorithm is triggered at the assistance data division module 430. The sub-region size is selected by the assistance data division module 430 in such a way that when a combinable amount of sub-regions are assembled together in the memory of the mobile device 12, the total size of the sub-regions will not exceed the designated maximum size. To satisfy this condition, the assistance data division module 430 imposes various restrictions. These restrictions may include, but are not limited to: the length of each sub-region (denoted herein as $l_s$, chosen based on the maximum AP range), the maximum number of APs per sub-region, the maximum number of nodes (e.g., anchor points and/or other predefined locations) per sub-region, and/or other criteria identified as a potential limiting factor of the ability of a mobile device 12 to process assistance data.

Based on at least the above criteria, a three-stage algorithm is used by the assistance data division module 430 to determine the number of sub-regions in which to divide a given region (also referred to herein as a "master region"). The algorithm proceeds as follows:

1) Define $l_x$ and $l_y$ as the width and height of the master region, respectively. In addition, define $l_s$ as an upper-bound length for each sub-region, as determined by the system analysis module 420. Based on these definitions, initial estimates for the number of sub-regions in the x and y dimensions, given as $k_x$ and $k_y$, respectively, are given as $$k_x = \frac{l_x}{l_s} \text{ and } k_y = \frac{l_y}{l_s}.$$

Next, based on a tolerance value tol defined according to 0<tol<1 the number of sub-regions on the x and y dimensions, denoted as $n_x$ and $n_y$, respectively, are determined from the initial estimates $k_x$ and $k_y$ as follows:

$$n_x = \begin{cases} \lfloor k_x \rfloor & \text{if } k_x - \lfloor k_x \rfloor < tol \\ \lfloor k_x \rfloor + 1 & \text{otherwise} \end{cases}$$

$$n_y = \begin{cases} \lfloor k_y \rfloor & \text{if } k_y - \lfloor k_y \rfloor < tol \\ \lfloor k_y \rfloor + 1 & \text{otherwise} \end{cases}$$

2) Next, assume that APs are uniformly distributed over the master region. Define an upper-bound number of APs per sub-region as maxAPs, and define the total number of APs as totAPs. Using these definitions, a first preliminary sub-region count $n_{AP}$ is computed as $$n_{AP} = \left\lceil \frac{totAPs}{maxAPs} \right\rceil.$$

Using $n_{AP}$, update $n_x$ and $n_y$ using the following pseudo-code:

```
while n_AP > n_x n_y
    if (n_x > n_y)
        n_y = n_y + 1;
    else
        n_x = n_x + 1;
    end if;
end while;
```

3) Define an upper-bound number of nodes per sub-region as maxNodes and the total number of nodes as totNodes. Using these definitions, a second preliminary sub-region count $n_N$ is computed as $$n_N = \left\lceil \frac{totNodes}{maxNodes} \right\rceil.$$

Using $n_N$, update $n_x$ and $n_y$ based on the following pseudo-code:

```
while n_N > n_x n_y
    if (n_x > n_y)
        n_y = n_y + 1;
```

```
       else
          n_x = n_x + 1;
       end if;
    end while;
```

Figure 5:
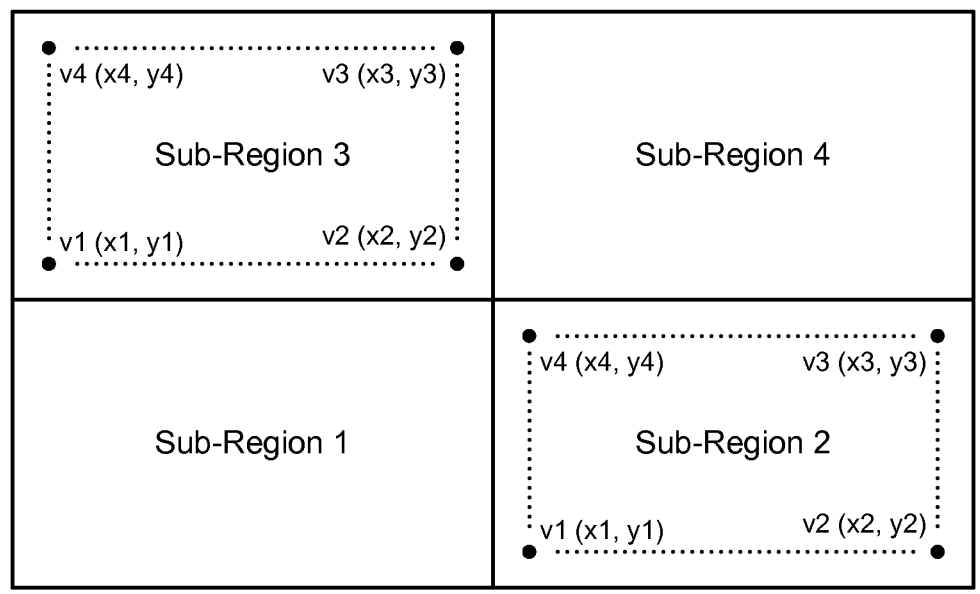
FIG. 5 is an illustrative view of sub-region definitions generated within a region.

To generalize the above, the assistance data division module 430 splits a master region into a number of sub-regions determined by computing initial sub-region counts associated with upper-bound sub-region sizes, AP densities and node densities and utilizing the highest of the initial counts. Diagram 500 in FIG. 5 illustrates a master region split into four sub-regions in a 2×2 grid by the assistance data division module 430. Each sub-region, and its associated assistance data, are defined by various parameters. These can include, but are not limited to, the following:

(1) Connectivity information, utility map, and heatmap information corresponding to the nodes in each sub-region.

(2) Coordinates of the lower left vertex of the sub-region, e.g., defined in relation to a map coordinate system associated with the master region and/or a global coordinate system.

(3) Length and height of the sub-region, e.g., given as a unit of measurement (e.g., feet, meters, etc.) and/or number of nodes.

(4) The MAC addresses of the APs located in each sub-region, given as an AP list and/or in other forms.

Other parameters for defining a sub-region and/or its associated data are also possible.

Figure 6:
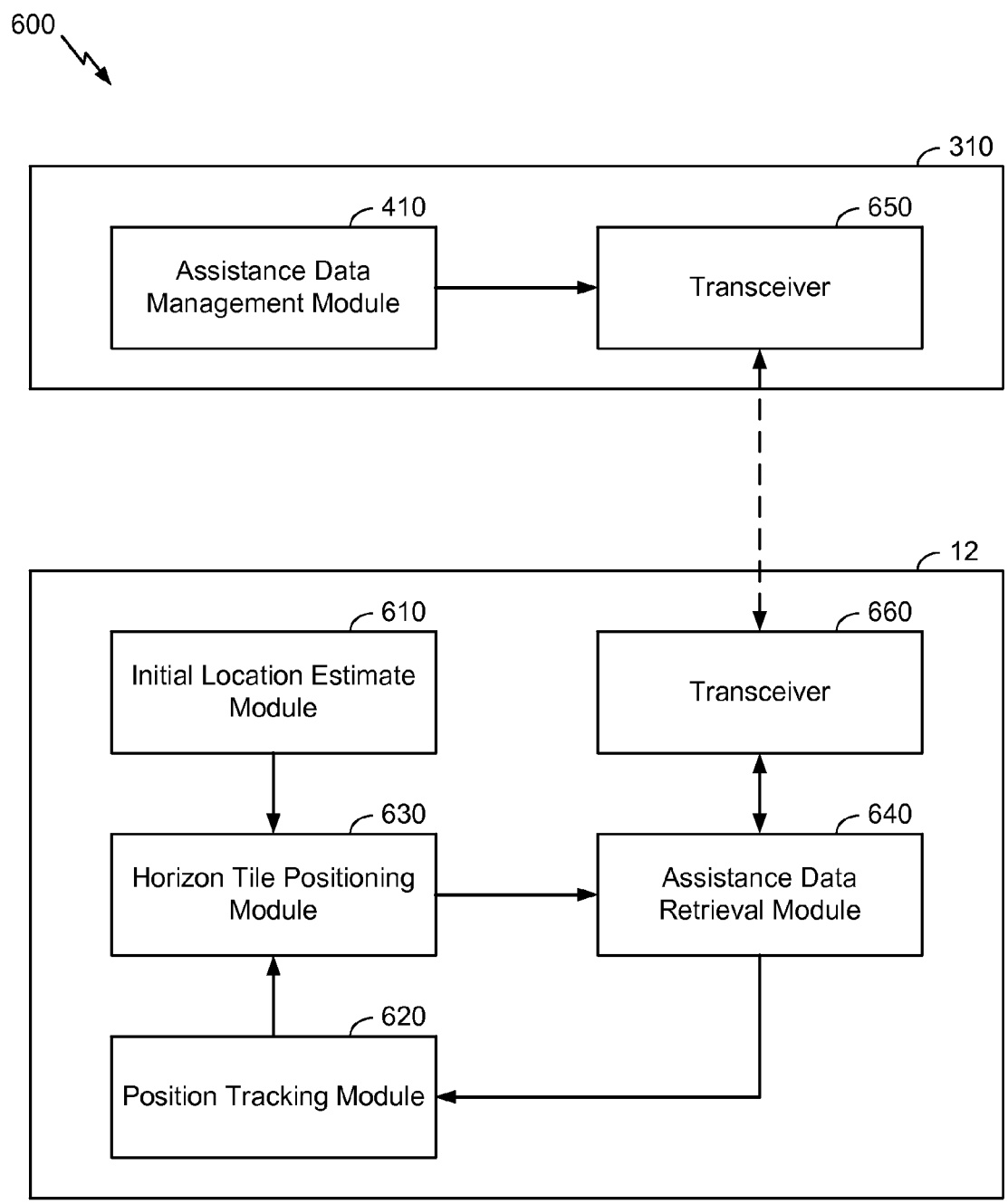
FIG. 6 is a block diagram of a system for retrieving and utilizing positioning assistance data.

Here, the assistance data division module 430 is implemented by the positioning server 310 to split the assistance data for a master region into sub-regions. The assistance data is split such that the connectivity data between regions and sub-regions is preserved. The assistance data for the sub-regions, along with their own bounding boxes, are encrypted and provided as a single entity to requesting mobile devices 12. This information may be provided over an N1 interface and/or by other means in a transparent manner to the mobile devices 12. For instance, as shown by system 600 in FIG. 6, assistance data can be transmitted from the positioning server 310 via a transceiver 650 to one or more mobile devices 12 via transceivers 660 at the mobile devices 12. The assistance data management module 410 performs format alterations to the sub-region assistance data to distinguish the sub-regions (e.g., with respect to size, bounding boxes, etc.), enabling the mobile device 12 to subsequently assemble or use the data. As noted above, however, the format changes described here are performed at the positioning server 310 and are transparent to the mobile devices 12.

Data received from the positioning server 310 and stored at the mobile device 12 are encrypted until needed. Decryption occurs upon loading the data into working memory or otherwise designating particular data for use. Thus, the positioning server 310 packages assistance data such that although data are encrypted once stored by a mobile device 12, the mobile device 12 can still select data corresponding to desired sub-regions.

The assistance data division module 430 can divide some or all assistance data associated with a given region. As an example, assistance data for a region can include a connectivity list, which, for each node in the region, contains information (e.g., binary 0/1 values) indexed for each node in the region and indicating whether the corresponding node is connected to each other node in the region. In splitting connectivity information into sub-regions, the assistance data division module 430 populates a sub-region connectivity list with information relating to the nodes located in the sub-region of interest. The sub-region connectivity list indicates whether nodes in the sub-region are connected to respective other nodes in the sub-region and may also indicate connectivity between nodes in the sub-region and nodes in other sub-regions within the original master region. Other information, such as heatmap information, may be divided in a similar manner.

As system 600 further shows, a mobile device 12 uses sub-region assistance data by defining and positioning a horizon tile relative to a position of the mobile device 12. The horizon tile is an area projected from a given point in a region, such as the estimated position of the mobile device. While the projected area corresponding to the horizon tile is shown as a square area in the following description and illustrations, the area may be of any suitable shape or size (e.g., circular or semicircular, rectangular, triangular, or any other regular or irregular shape of any size). An initial location estimate module 610 and position tracking module 620 are used to estimate the position of the mobile device 12, based on which a horizon tile positioning module 630 defines and positions a horizon tile relative to the mobile device 12. An assistance data retrieval module 640 then retrieves assistance data relating to sub-regions overlapping the horizon tile. The assistance data obtained by the assistance data retrieval module 640 may be obtained from one or more local data stores (e.g., disk drives or other computer-readable media) associated with the mobile device 12; alternatively, the assistance data retrieval module 640 may request assistance data that are not locally stored from the positioning server 310 via the transceiver 660. The operations of the mobile device 12 and its illustrated components 610, 620, 630, 640, 660 are described in further detail below.

Figure 7:
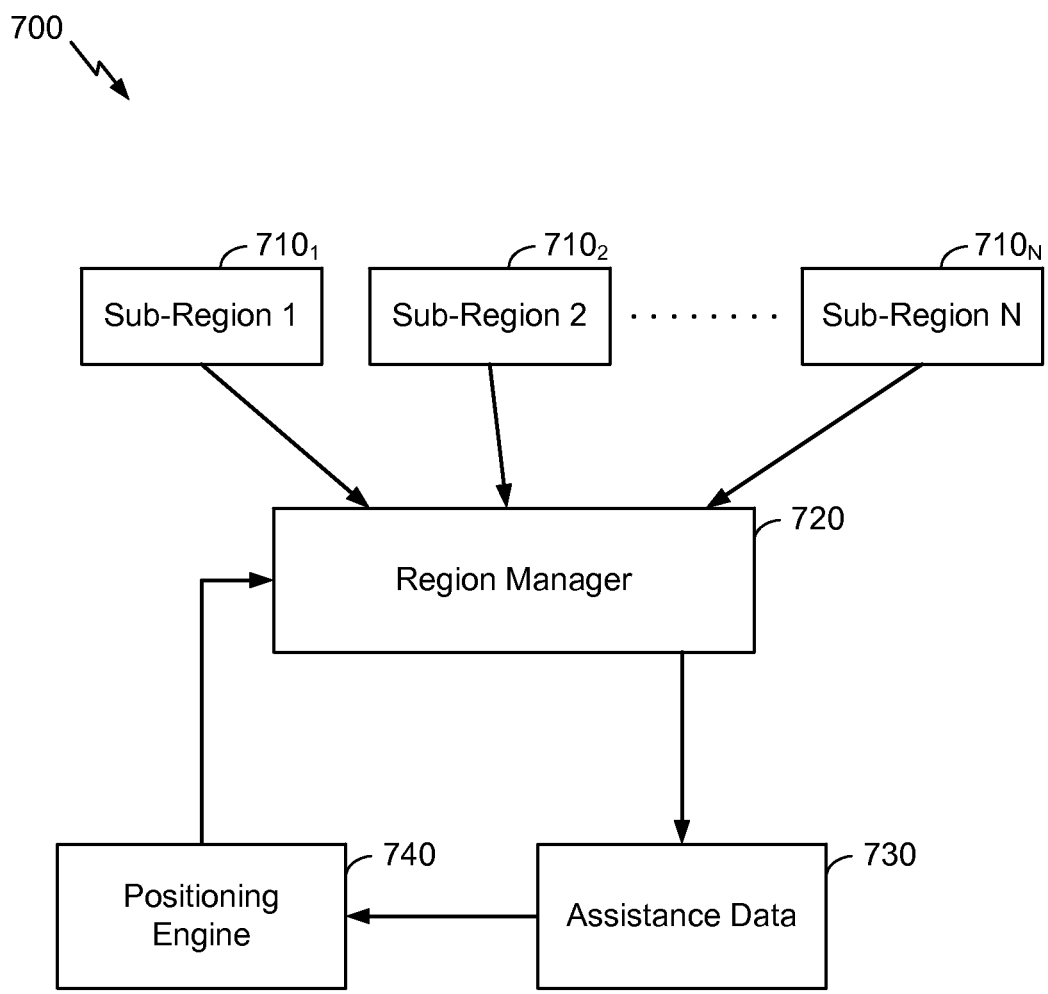
FIG. 7 is a block diagram of a region management system utilizing sub-region definitions.

Diagram 700 in FIG. 7 illustrates a functional implementation of the sub-region processing techniques described herein as implemented at a mobile device 12. A positioning application (e.g., implemented in software and/or hardware) at the mobile device 12 unpacks sub-regions 710 from a master region. The data sent to the mobile device 12 are encrypted, and decryption occurs at the mobile device 12 as needed. The data corresponding to the sub-regions 710 are saved in system memory. A region manager 720 maintains the sub-region data and facilitates selection of relevant sub-regions 710. As sub-regions 710 are needed, the region manager 720 facilitates the decryption of the relevant assistance data 730 and provides the assistance data 730 to process memory (e.g., RAM) to be utilized by a positioning engine 740. The sub-regions 710 are partitioned as described above and as shown in diagram 500. Once assistance data 730 for a given sub-region 710 is no longer needed by the positioning engine 730, the old assistance data 730 are removed from the process memory and, if needed, new assistance data 730 are obtained. The positioning algorithm utilized by the mobile device 12 includes three stages, which are outlined and then described in further detail below.

1) Region disambiguation: Determine the region (e.g., building, floor, etc.) in which the user is located. This step is performed prior to tiling.

2) No-fix (sub-region disambiguation) mode: In this stage, an algorithm is deployed for choosing initial sub-regions and providing the corresponding assistance data to the positioning engine 740. This stage is based on measured RSSI values and/or other signal parameters.

3) Tracking mode: In this stage, based on the current fix, another algorithm is implemented for choosing relevant sub-regions.

Region disambiguation is performed by the mobile device 12 according to various techniques generally known in the art.

Once a present region is determined, the no-fix and tracking modes are used to define a horizon tile and to select relevant sub-regions as described below. Any number and/or configuration of sub-regions 710 could be selected for further use. For instance, a single sub-region or a group of contiguous sub-regions in any size (e.g., m×n for any m and n greater than 0) could be selected. The number of sub-regions selected can be predetermined, or alternatively the number of sub-regions could be dynamically scaled based on available memory at the mobile device 12 or other factors. By utilizing assistance data corresponding to sub-regions 710, the mobile device 12 may change the assistance data in process memory only when the horizon tile for the mobile device 12 enters a new sub-region, thereby reducing file system and network loading corresponding to dynamically maintaining assistance data for a region defined around the mobile device 12 in real time.

Figure 8:
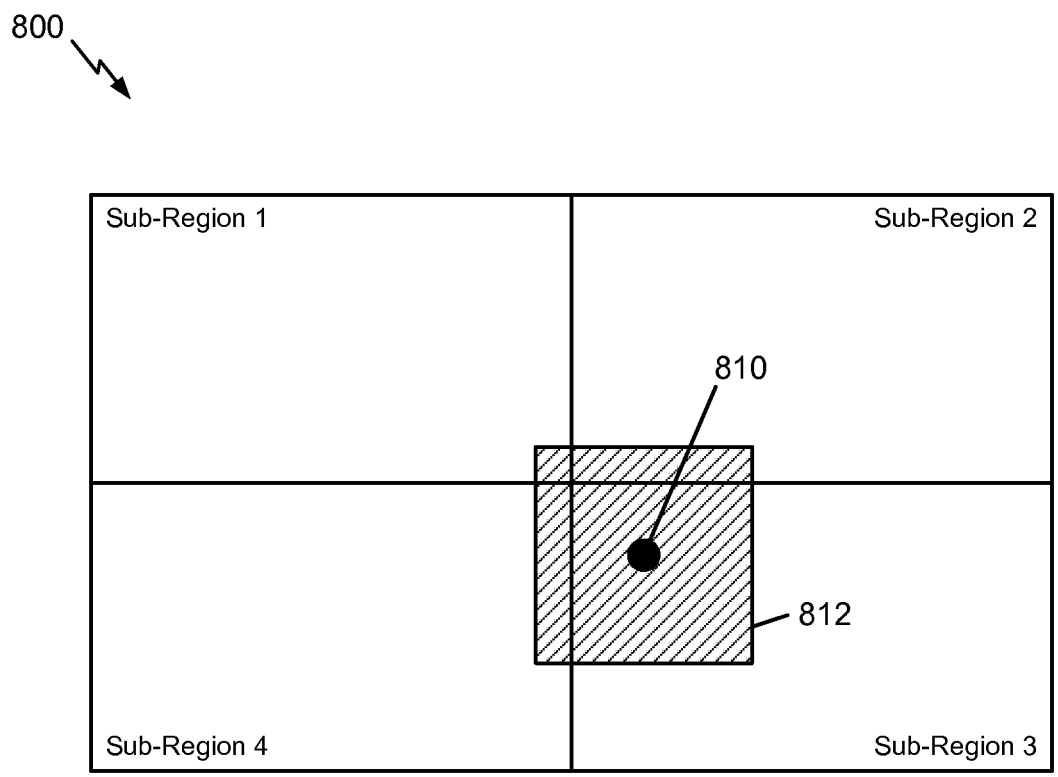
FIGS. 8-13 are diagrams illustrating horizon tile placement and sub-region identification performed by the system shown in FIG. 6.

The no-fix mode proceeds by first defining a horizon tile 812, as shown in diagram 800 in FIG. 8. While the horizon tile 812 is illustrated as square, other shapes are possible. The size of the horizon tile 812 is determined by the range of the APs within the region (e.g., a maximum AP range, etc.). Here, each side of the horizon tile 812 has a length approximately equal to two times the maximum AP range within the region. However, other sizes could be used as appropriate.

As the name implies, there is no previous position fix available in the no-fix mode. Thus, the horizon tile 812 and its center point 810 are determined using measured RSSI values corresponding to different APs located in the region. The horizon tile 812 is defined and relevant sub-regions are selected as follows.

1) Identify the highest RSSI measured at the mobile device 12. This step may be performed via a passive scan performed multiple times in order to reduce the chance of missing APs located in the region.

2) Find the corresponding MAC address of the AP with the highest measured RSSI. Using AP lists (e.g., maintained locally at the mobile device 12 or obtained via a communications network), find the relevant sub-region in which the AP is located.

3) Use the AP's heatmap corresponding to the sub-region to roughly estimate the location of the AP. This is done by, e.g., finding the location on the heatmap where the heatmap value is highest. This point is the estimated AP location.

4) Define a center point 810 for the horizon tile 812 at the AP's estimated location. While this is a rough estimate of the position of the mobile device 12, any inaccuracy in the initial estimate can be reduced by selecting a sufficiently large horizon tile size.

5) Select the sub-regions that overlap the horizon tile 812, and fetch the assistance data corresponding to each of the selected sub-regions as described above.

Figure 9:
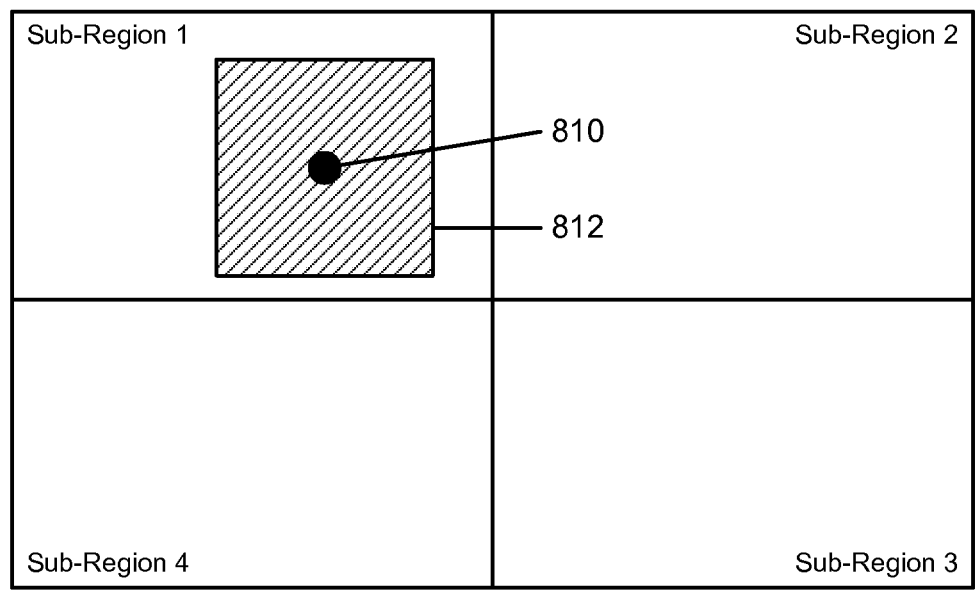
Figure 10:
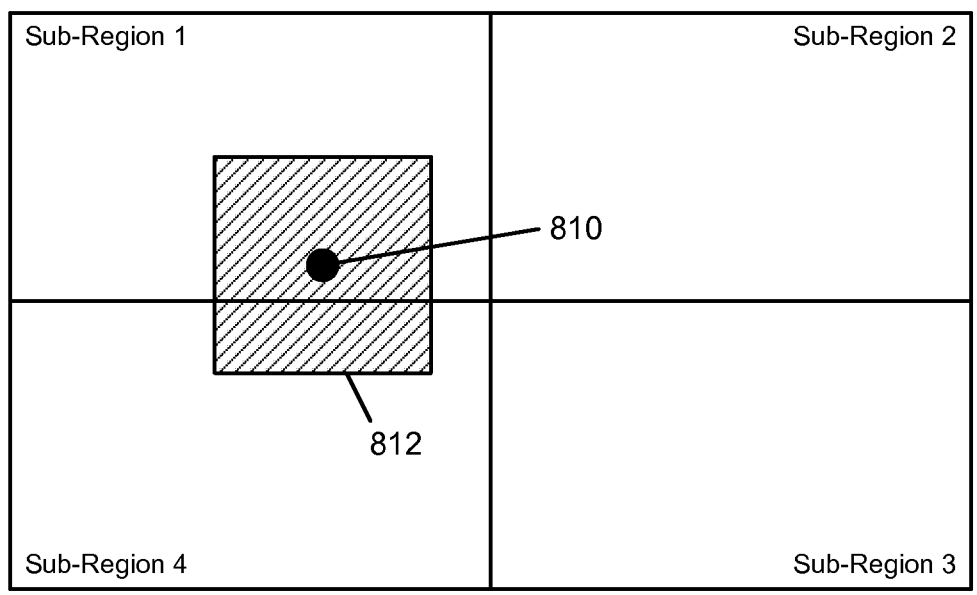
Figure 11:
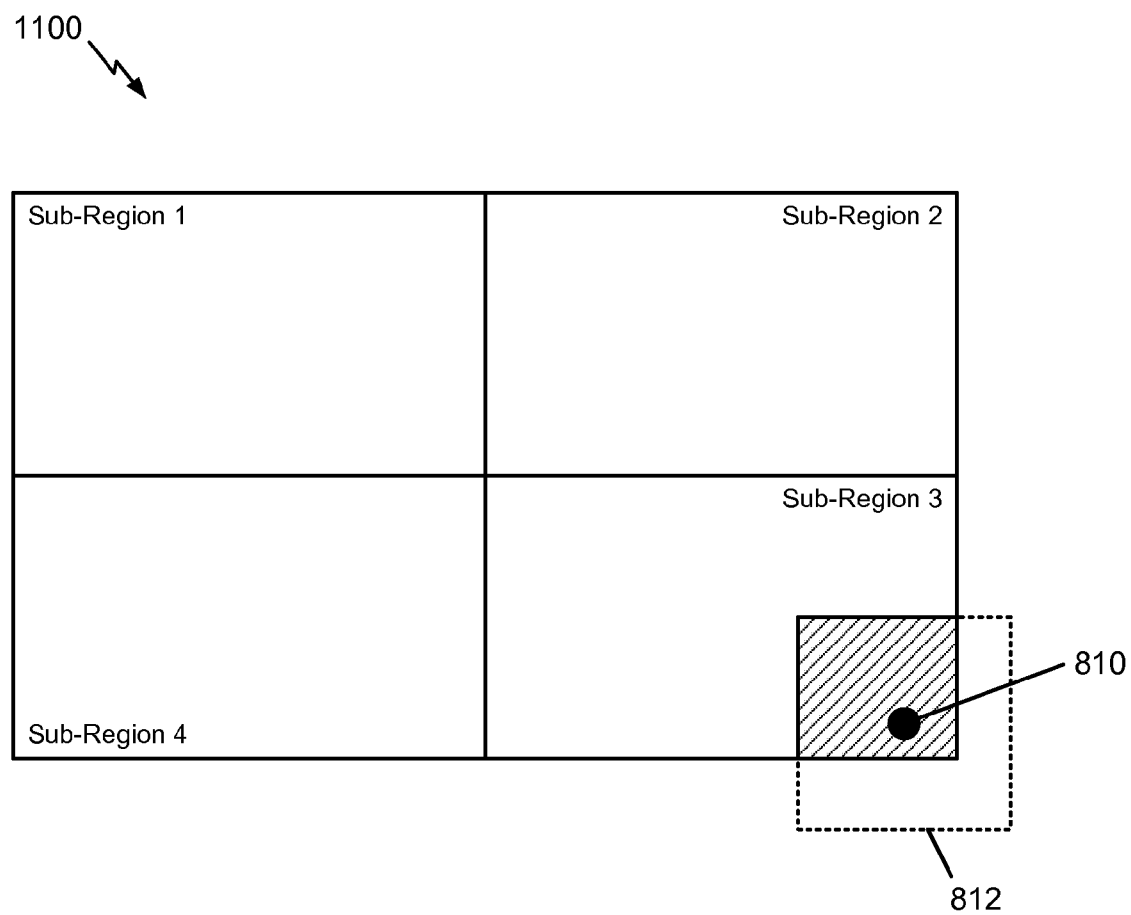

Based on the position of the horizon tile 812, the mobile device 12 maintains a dynamic set of sub-regions loaded in its process (working) memory. Diagrams 900 and 1000 in FIGS. 9 and 10 show situations in which the horizon tile 812 overlaps with one and two sub-regions, respectively. If the center point 810 of the horizon tile 812 is near a border of the master region, some regions of the horizon tile 812 may be located outside the master region. In this case, the horizon tile is cut such that it is confined within the area of the master region. This is shown in diagram 1100 in FIG. 11.

The no-fix mode described above is utilized at the beginning of positioning, although it may be used in other situations as well. For instance, the no-fix mode may be utilized in cases in which the mobile positioning system resets (e.g., after a period of inactivity, etc.), when positioning measurements are not available for a certain amount of time, or for other reasons. In these situations, the no-fix mode employs the most recent set of measurements received.

Once position outputs are obtained from the positioning engine 740 (e.g., via a particle filter), the positioning engine 740 enters tracking mode. In tracking mode, the obtained position outputs (e.g., given as (x, y) coordinates relative to the current region) are used by the region manager 720 to decide which sub-regions to be used for generating the assistance data for the positioning engine 740.

The region manager 720 uses the current position output of the positioning engine 740 as the center point 810 of the horizon tile 812 similarly to that described above for the no-fix mode and shown in diagram 800. Next, the region manager 720 determines which sub-regions are to be used for generating the assistance data for the horizon tile 812. If needed, the region manager 720 fetches the appropriate information for these sub-regions and stitches them together to provide the assistance data for the consumption of the positioning engine 840.

In both the no-fix and tracking modes, the mobile device 12 is configured with a number of sub-regions that are to be managed simultaneously. Here, the mobile device 12 is configured to manage four sub-regions in a 2×2 grid, although other configurations are possible. The assistance data corresponding to the present sub-regions of interest are kept in process memory (e.g., RAM). When the horizon tile 812 is updated, some data from previously used sub-regions may be retained, thereby reducing the need for accessing the file system and/or network resources frequently. This reduces time associated with file system access (e.g., approximately 100-500 ms per access) in exchange for keeping some unused assistance data in the RAM. In addition to reducing the amount of file system access, retaining sub-regions in the RAM makes the positioning algorithms described above more robust to ping-pong effects. In particular, if the position fix goes back and forth between two close points, the assistance data will not be updated.

If the horizon tile 812 overlaps with fewer sub-regions than the total number of sub-regions the mobile device 12 is configured to manage simultaneously, the mobile device 12 can select surrounding sub-regions in any suitable manner. For instance, in the scenarios shown in diagrams 900, 1000, the mobile device 12 may load assistance data for each of sub-regions 1-4. The surrounding sub-regions loaded into process memory may be selected based on predetermined rules or criteria. For example, they may be selected based on relative position (e.g., select sub-regions located to the left/right or top/bottom of the horizon tile 812). Alternatively, they may be selected based on previous mobile positions and/or previously stored sub-regions in order to minimize file system and/or network access, as described above. For instance, if the horizon tile 812 as shown in diagrams 900, 1000 moved solely within sub-regions 1-4 and no other sub-regions, the assistance data loaded in RAM at the mobile device would not change.

Figure 12:
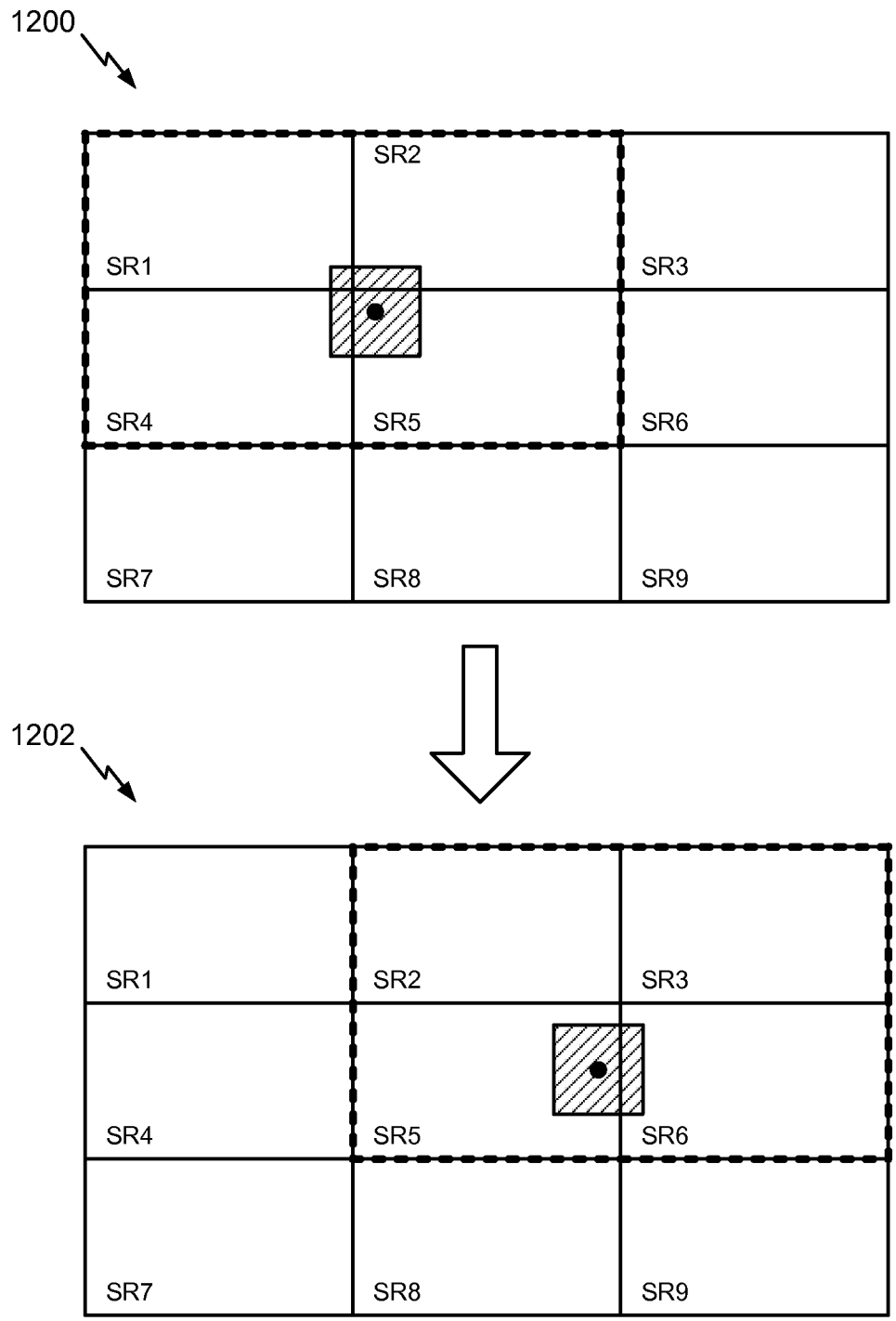
Figure 13:
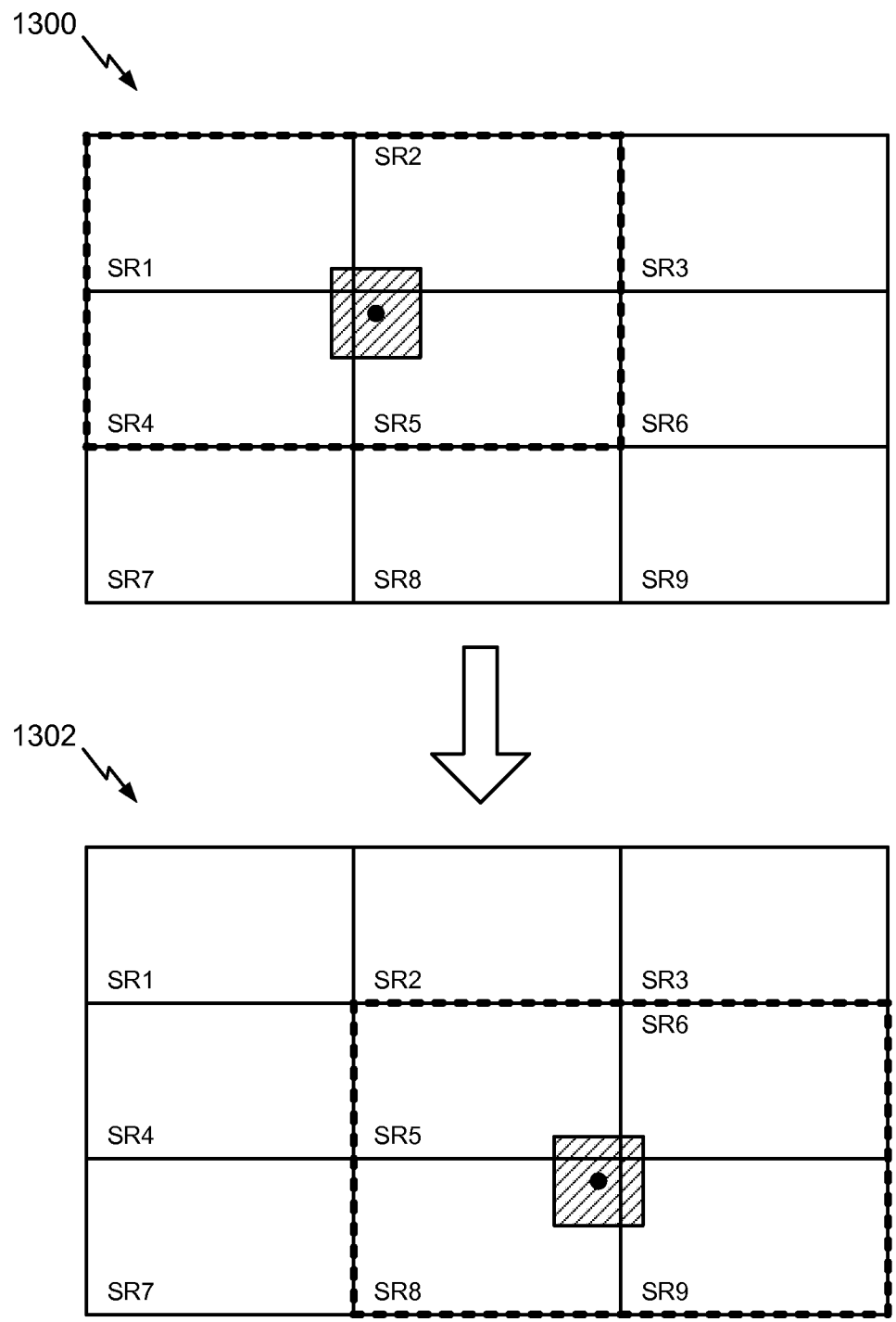

If the horizon tile 812 enters a new sub-region, new sub-regions are selected such that the desired number and configuration of sub-regions are maintained in the RAM. For instance, in diagram 1200 in FIG. 12, the horizon tile 812 begins in sub-regions 1, 2, 4 and 5. If the horizon tile 812 moves to sub-region 6 as shown in diagram 1202, sub-regions 3 and 6 are fetched such that sub-regions 2, 3, 5 and 6 located in the RAM form a rectangle. If the horizon tile 812 enters more than one new sub-region, the new sub-regions are fetched such that the sub-regions loaded in the RAM form the desired configuration. For instance, as shown in FIG. 13 for a horizon tile that moves from sub-regions 1, 2, 4 and 5 in diagram 1300 to sub-regions 5, 6, 8 and 9 in diagram 1302, sub-regions 6, 8 and 9 are fetched after the movement to form a new rectangle with previously loaded sub-region 5.

When the horizon tile 812 is updated and new sub-regions are fetched and loaded into the RAM, portions of the previous sub-region data are discarded and/or re-used. The sub-region data may be reorganized, re-indexed or renamed, etc., to account for changes in the utilized sub-regions. For instance, in a system where nodes are named and/or indexed relative to their position in a region, nodes are re-indexed and/or renamed upon fetching new sub-regions. Other operations are also possible.

Figure 14:
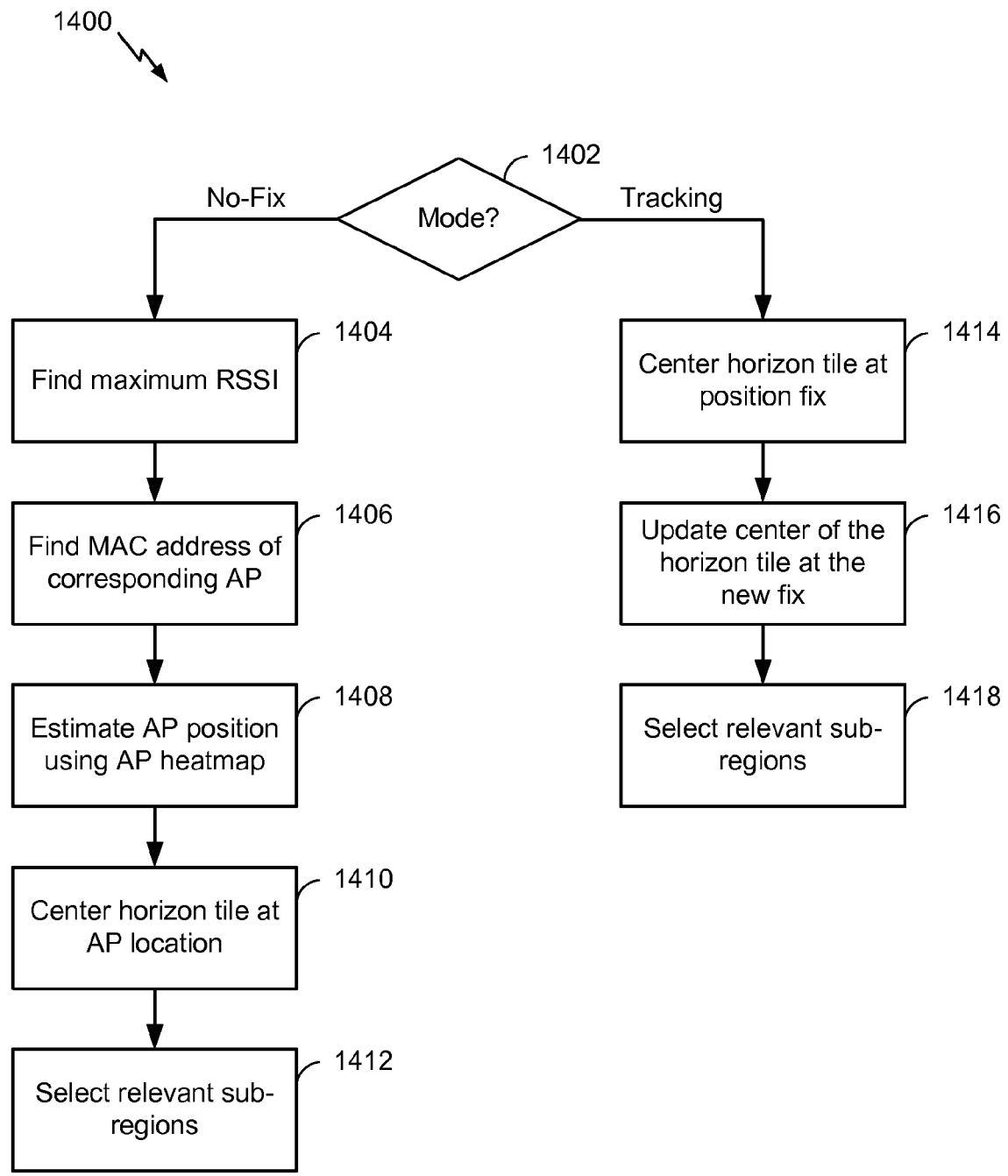
FIG. 14 is a functional block diagram of a tiling algorithm performed by the system shown in FIG. 6.

The operation of a positioning system as described above in the no-fix and tracking modes is summarized by flow diagram 1400 in FIG. 14. At stage 1402, the present mode is determined. For the no-fix mode, stages 1404-1412 are performed. At stage 1404, a maximum measured RSSI is found. At stage 1406, the MAC address of the AP corresponding to the maximum RSSI is found. At stage 1408, the location of the AP is estimated using an AP heatmap. At stage 1410, a horizon tile 812 is centered at the AP location. At stage 1412, the relevant sub-regions are selected and loaded relative to the horizon tile 812.

For the tracking mode, stages 1414-1418 are performed. At stage 1414, a horizon tile 812 is centered at a present position fix. At stage 1416, the center of the horizon tile 812 is updated based on a subsequent position fix. At stage 1418, relevant sub-regions are selected and loaded relative to the horizon tile 812.

Figure 15:
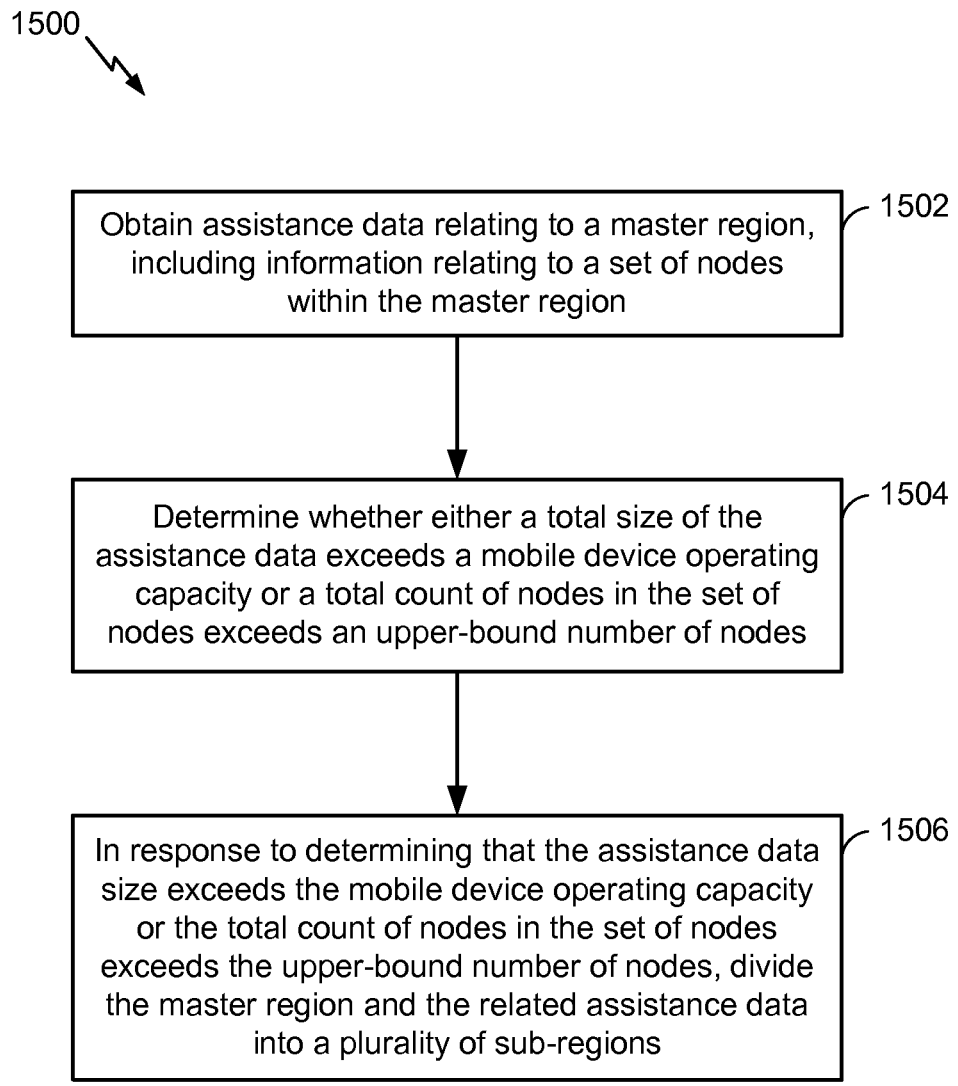
FIG. 15 is a block flow diagram of a process of managing sub-region position assistance data.

Referring to FIG. 15, with further reference to FIGS. 1-14, a process 1500 of managing sub-region position assistance data includes the stages shown. The process 1500 is, however, an example only and not limiting. The process 1500 can be altered, e.g., by having stages added, removed, rearranged, combined, and/or performed concurrently. Still other alterations to the process 1500 as shown and described are possible.

At stage 1502, assistance data for a master region, such as connectivity, utility and/or heatmap information, vertex coordinates of the region, length and width of the region (e.g., given by units of measurement and/or number of nodes), the MAC addresses or other identifiers of APs or other entities which have influence on the region, etc., is obtained. The assistance data is obtained at a positioning server 310 and/or other suitable device or combination of devices associated with a communications network via, e.g., an assistance data management module 410. The assistance data obtained at stage 1502 is composed at least partially of information (e.g., connectivity maps, utility maps, heatmaps, etc.) relating to a set of nodes within the master region.

At stage 1504, a determination is made, e.g., by a system analysis module 420, whether either (1) a total size of the assistance data obtained at stage 1502 for the master region exceeds a given mobile device operating capacity, or (2) a total count of nodes in the set of nodes identified at stage 1502 exceeds an upper-bound number of nodes. The mobile device operating capacity may be a single network-wide parameter, such as an average or minimum operating capacity, or alternatively multiple capacity parameters can be considered and processed. The operating capacity parameters may be defined in a variety of ways, such as, but not limited to, maximum region length, maximum number of APs per region, maximum assistance data file size, etc.

At stage 1506, in response to a positive determination at stage 1504, the assistance data is divided, e.g., by an assistance data division module 430, into a plurality of sub-regions. Here, division of the assistance data at stage 1506 is performed based on one or more of the operating capacity parameters used at stage 1504 by identifying a number of sub-regions that an associated mobile device is configured to assemble and dividing the assistance data such that the sub-region assistance data, once assembled at the mobile device, will not exceed the operating capacity of the mobile device and/or the upper bound number of nodes. The assistance data may be divided in relation to an upper-bound sub-region length, upper-bound number of APs and/or nodes per sub-region, etc., to construct a grid of sub-regions similar to that shown by diagram 500. The parameters used to divide the region at stage 1506 may be the same as, or different from, the parameters used at stage 1504. Further, the assistance data may be divided at stage 1506 into one set of sub-regions, or alternatively multiple sets of sub-regions may be created in which each set of sub-regions uses a different sub-region size. Multiple sub-region sets may be used, for example, in cases in which multiple mobile device operating capacity parameters are considered at stage 1504. Other divisions are possible.

Figure 16:
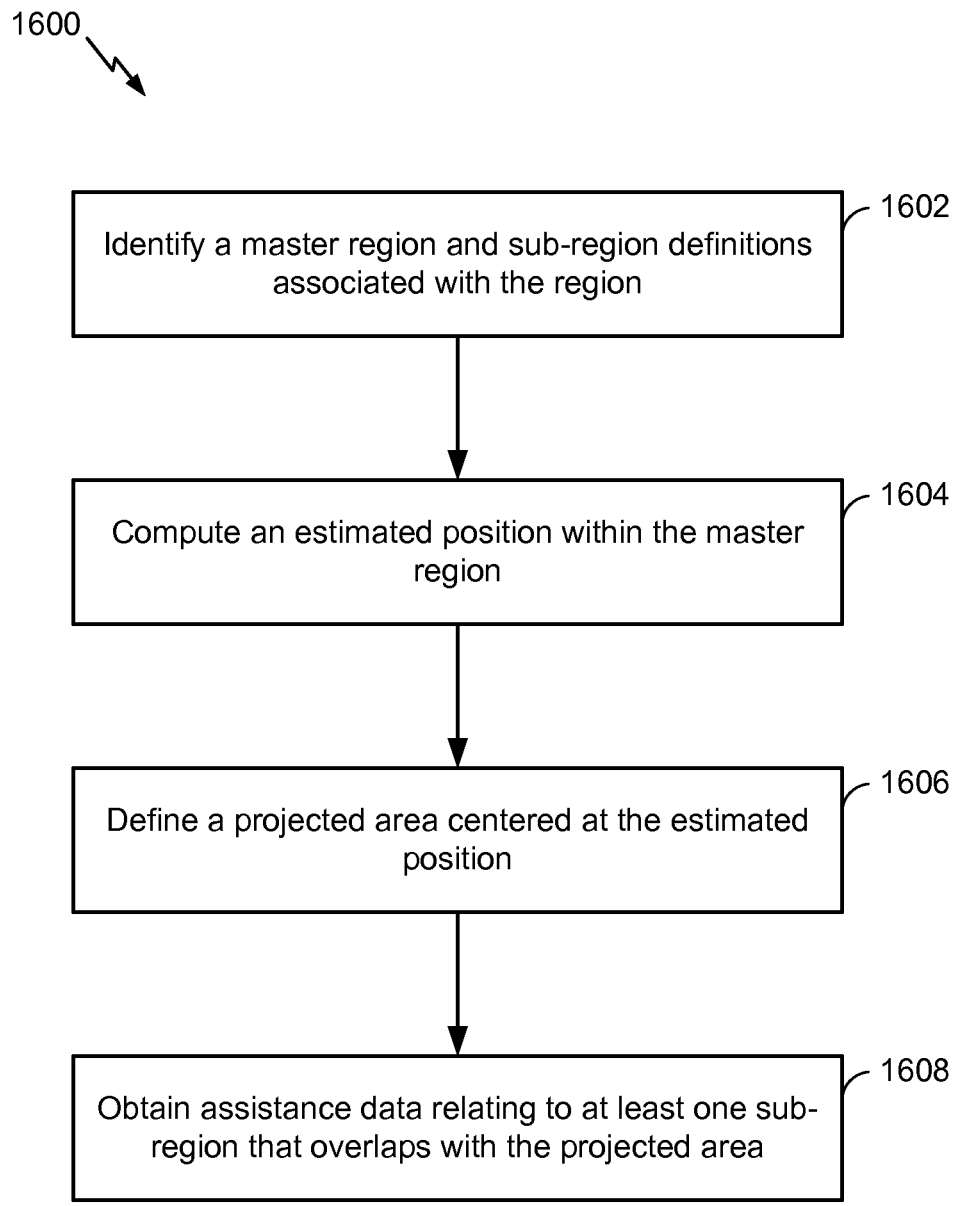
FIG. 16 is a block flow diagram of a process of retrieving sub-region position assistance data.

Referring to FIG. 16, with further reference to FIGS. 1-14, a process 1600 of retrieving sub-region position assistance data includes the stages shown. The process 1600 is, however, an example only and not limiting. The process 1600 can be altered, e.g., by having stages added, removed, rearranged, combined, and/or performed concurrently. Still other alterations to the process 1600 as shown and described are possible.

At stage 1602, a present, master region and sub-region definitions associated with the region are identified. The sub-region definitions are indicative of, among other information as described above, area occupied by the respective sub-regions within the region. Here, identification of the master region corresponds to determining an indoor or outdoor region (e.g., a building or floor of a building, an outdoor shopping center or park, etc.) at which a device, such as a mobile device 12, is located. Sub-region definitions are generated by a positioning server 310 or other means as described above and provided to the device in any suitable manner for conveying information to a computing device.

At stage 1604, an estimated position within the master region is determined. As described above, an estimated position within a region can be computed using a no-fix mode (e.g., via an initial location estimate module 610) if no previous usable position information is present, or a tracking mode (e.g., via a position tracking module 620) based on previous usable position information if such information is available. In general, the no-fix mode estimates position of a device based on a closest AP to the device (e.g., as determined according to RSSI measurements or other AP parameters), while the tracking mode estimates position of a device using one or more previously estimated positions in combination with previously obtained assistance data.

At stage 1606, a projected area, e.g., a horizon tile 812, is defined such that a center point 810 of the projected area is located at the estimated position determined at stage 1604. The area is defined by, e.g., a horizon tile positioning module 630 using position information obtained via either the no-fix mode or tracking mode, as described above.

At stage 1608, assistance data relating to at least one sub-region of the present region that overlaps with the projected area defined at stage 1606 is obtained. If the overlapping sub-regions are stored locally at a device performing the process 1600, the sub-regions can be loaded from storage into working or process memory (e.g., via an assistance data retrieval module 640). If the sub-regions are not stored locally, the device requests the sub-region data from a positioning server 310 (e.g., via the assistance data request module 640 through a transceiver 660).

Figure 17:
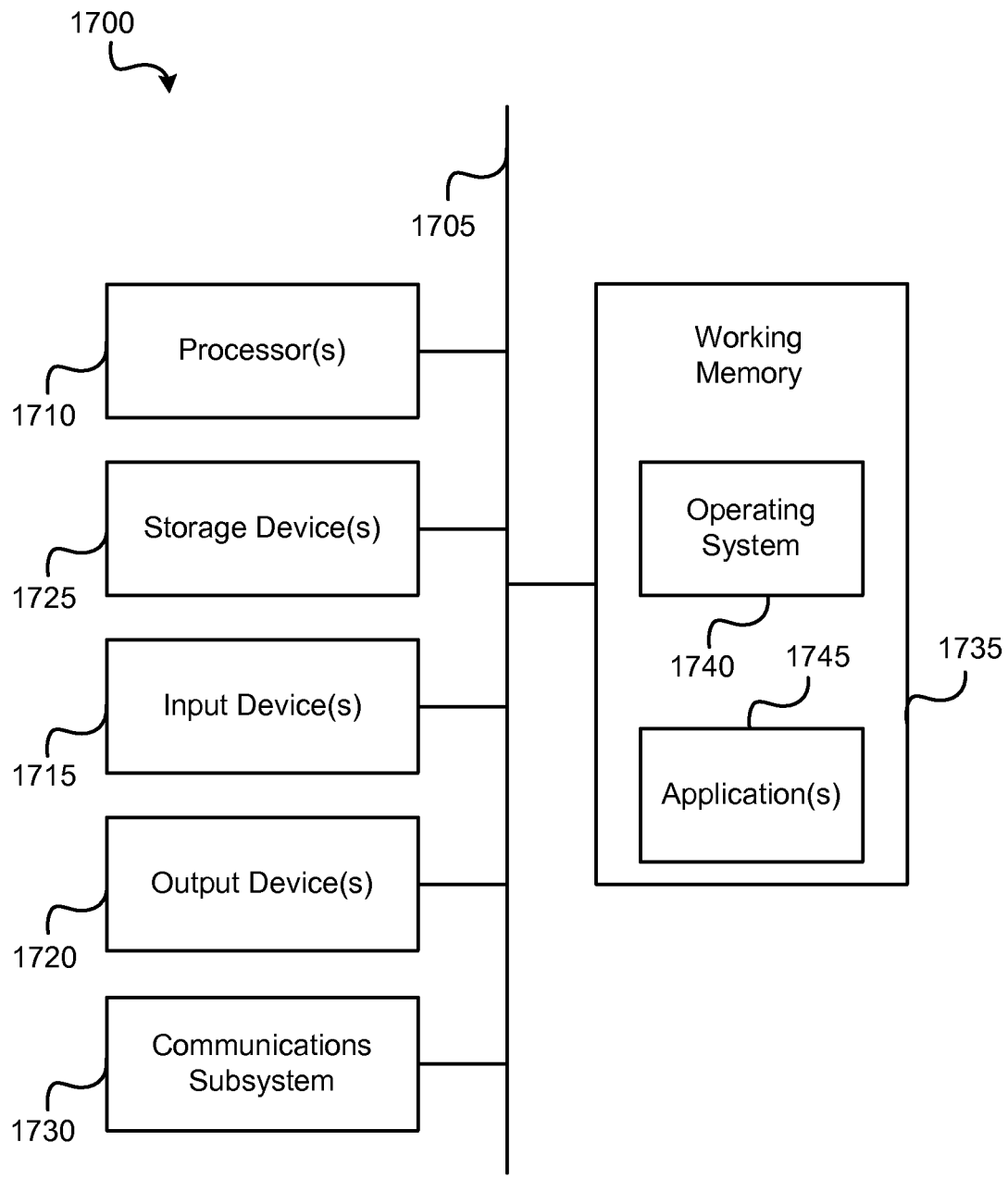
FIG. 17 is a block diagram of an example of a computer system.

A computer system 1700 as illustrated in FIG. 17 may be utilized to at least partially implement the functionality of the previously described computerized devices. FIG. 17 provides a schematic illustration of one embodiment of a computer system 1700 that can perform the methods provided by various other embodiments, as described herein, and/or can function as a mobile device or other computer system. FIG. 17 provides a generalized illustration of various components, any or all of which may be utilized as appropriate. FIG. 17, therefore, broadly illustrates how individual system elements may be implemented in a relatively separated or relatively more integrated manner.

The computer system 1700 is shown comprising hardware elements that can be electrically coupled via a bus 1705 (or may otherwise be in communication, as appropriate). The hardware elements may include one or more processors 1710, including without limitation one or more general-purpose processors and/or one or more special-purpose processors (such as digital signal processing chips, graphics acceleration processors, and/or the like); one or more input devices 1715, which can include without limitation a mouse, a keyboard and/or the like; and one or more output devices 1720, which can include without limitation a display device, a printer and/or the like. The processor(s) 1710 can include, for example, intelligent hardware devices, e.g., a central processing unit (CPU) such as those made by Intel® Corporation or AMD®, a microcontroller, an ASIC, etc. Other processor types could also be utilized.

The computer system 1700 may further include (and/or be in communication with) one or more non-transitory storage devices 1725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1700 might also include a communications subsystem 1730, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1730 may permit data to be exchanged with a network (such as the network described below, to name one example), other computer systems, and/or any other devices described herein. In many embodiments, the computer system 1700 will further comprise, as here, a working memory 1735, which can include a RAM or ROM device, as described above.

The computer system 1700 also can comprise software elements, shown as being currently located within the working memory 1735, including an operating system 1740, device drivers, executable libraries, and/or other code, such as one or more application programs 1745, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 1725 described above. In some cases, the storage medium might be incorporated within a computer system, such as the system 1700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1700 and/or might take the form of source and/or installable code, which, upon compilation and/or installation on the computer system 1700 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 1700) may be used to perform methods in accordance with the disclosure. Some or all of the procedures of such methods may be performed by the computer system 1700 in response to processor 1710 executing one or more sequences of one or more instructions (which might be incorporated into the operating system 1740 and/or other code, such as an application program 1745) contained in the working memory 1735. Such instructions may be read into the working memory 1735 from another computer-readable medium, such as one or more of the storage device(s) 1725. Merely by way of example, execution of the sequences of instructions contained in the working memory 1735 might cause the processor(s) 1710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1700, various computer-readable media might be involved in providing instructions/code to processor(s) 1710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1725. Volatile media include, without limitation, dynamic memory, such as the working memory 1735. Transmission media include, without limitation, coaxial cables, copper wire and fiber optics, including the wires that comprise the bus 1705, as well as the various components of the communication subsystem 1730 (and/or the media by which the communications subsystem 1730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1700. These signals, which might be in the form of electromagnetic signals, acoustic signals, optical signals and/or the like, are all examples of carrier waves on which instructions can be encoded, in accordance with various embodiments of the invention.

The communications subsystem 1730 (and/or components thereof) generally will receive the signals, and the bus 1705 then might carry the signals (and/or the data, instructions, etc. carried by the signals) to the working memory 1735, from which the processor(s) 1705 retrieves and executes the instructions. The instructions received by the working memory 1735 may optionally be stored on a storage device 1725 either before or after execution by the processor(s) 1710.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for managing positioning assistance data, the method comprising:
    obtaining assistance data relating to a master region, the assistance data comprising information relating to a set of nodes within the master region;
    determining whether either a total size of the assistance data exceeds a mobile device operating capacity or a total count of nodes in the set of nodes exceeds an upper-bound number of nodes; and
    in response to determining that either the total size of the assistance data exceeds the mobile device operating capacity or the total count of nodes in the set of nodes exceeds the upper-bound number of nodes, dividing the master region into a plurality of sub-regions according to one or more criteria, wherein the one or more criteria include an upper bound sub-region length, and upper bound number of access points per sub-region, or an upper bound number of anchor points per sub-region, or any combination thereof.

2. The method of claim 1 wherein the dividing comprises:
    identifying a number of sub-regions a mobile device is configured to assemble; and
    configuring sizes of the sub-regions such that a combined size of assistance data associated with the number of sub-regions the associated mobile device is configured to assemble does not exceed the mobile device operating capacity.

3. The method of claim 1 wherein the dividing comprises:
    identifying a number of sub-regions a mobile device is configured to assemble; and
    configuring sizes of the sub-regions such that a combined number of nodes in the assistance data associated with the number of sub-regions the mobile device is configured to assemble does not exceed the upper-bound number of nodes.

4. The method of claim 1 wherein the dividing comprises adding at least one of the size of each of the sub-regions, length of each of the sub-regions or width of each of the sub-regions to the assistance data of each respective sub-region.

5. The method of claim 1 wherein obtaining the assistance data comprises obtaining first information comprising at least one of connectivity data for nodes in the master region, a utility map corresponding to the master region, or a heatmap relating to access points in the master region.

6. The method of claim 5 wherein the dividing comprises dividing the first information into second information for respective ones of the sub-regions, the second information comprising at least one of connectivity data for nodes in the sub-region, a utility map corresponding to the sub-region, or a heatmap relating to access points in the sub-region.

7. The method of claim 1 further comprising computing vertex coordinates for respective ones of the sub-regions and adding the vertex coordinates to the assistance data for the respective ones of the sub-regions.

8. The method of claim 1 further comprising transmitting the assistance data relating to the master region and assistance data relating to the sub-regions to at least one mobile device.

9. A method for retrieving positioning assistance data at a mobile device, the method comprising:
 identifying a master region in which the mobile device is located and sub-region definitions associated with the master region, wherein the sub-region definitions are indicative of area occupied by the sub-regions within the master region;
 determining a first estimated position of the mobile device based on information obtained from at least one communication entity, wherein the first estimated position is within the master region; defining a projected area centered at the first estimated position;
 comparing the projected area to the master region and selecting at least one sub-region that overlaps the projected area; and
 obtaining first assistance data corresponding to at least one sub-region that overlaps the projected area.

10. The method of claim 9 wherein defining the projected area comprises defining the projected area based at least in part on access point (AP) ranges within the master region.

11. The method of claim 9 wherein obtaining the first estimated position comprises:
 measuring signal strengths corresponding to access points (APs) within communication range of the mobile device;
 designating an AP having a highest signal strength as a selected AP; and
 setting the first estimated position to a position of the selected AP.

12. The method of claim 11 further comprising obtaining an AP heatmap corresponding to the master region, wherein obtaining the first estimated position further comprises identifying the position of the selected AP based on the AP heatmap.

13. The method of claim 12 wherein obtaining the first estimated position further comprises obtaining a media access control (MAC) address of the selected AP and locating the selected AP using the AP heatmap according to the MAC address of the selected AP.

14. The method of claim 9 further comprising obtaining a second estimated position of the mobile device based on the first estimated position of the mobile device and the first assistance data.

15. The method of claim 14 further comprising: repositioning the projected area such that the projected area is centered at the second estimated position; and obtaining second assistance data corresponding to at least one sub-region that overlaps the projected area subsequent to the repositioning.

16. The method of claim 15 wherein obtaining the first assistance data comprises loading the first assistance data into a process memory at the mobile device.

17. The method of claim 16 further comprising discarding respective portions of the first assistance data from the process memory that correspond to sub-regions that do not overlap the projected area and loading the second assistance data into the process memory subsequent to the repositioning.

18. The method of claim 9 wherein defining the projected area comprises altering a shape of the projected area such that instead of extending beyond the master region the projected area is entirely within the master region.

19. An apparatus for managing positioning assistance data, the apparatus comprising:
 an assistance data management module configured to obtain assistance data relating to a master region, the assistance data comprising information relating to a set of nodes within the master region;
 a system analysis module communicatively coupled to the assistance data management module and configured to determine whether either a total size of the assistance data exceeds a mobile device operating capacity or a total count of nodes in the set of nodes exceeds an upper-bound number of nodes; and
 an assistance data division module communicatively coupled to the assistance data management module and the system analysis module and configured to divide the master region into a plurality of sub-regions according to one or more criteria in response to determining that either the total size of the assistance data exceeds the mobile device operating capacity or the total count of nodes in the set of nodes exceeds the upper-bound number of nodes, wherein the one or more criteria include an upper bound sub-region length, and upper bound number of access points per sub-region, or an upper bound number of anchor points per sub-region, or any combination thereof.

20. The apparatus of claim 19 wherein:
 the assistance data management module is configured to obtain first assistance data comprising at least one of connectivity data for nodes in the master region, a utility map corresponding to the master region, or a heatmap relating to access points in the master region; and
 the assistance data division module is further configured to divide the first assistance data into second assistance data for respective ones of the sub-regions, the second assistance comprising at least one of connectivity data for nodes in the sub-region, a utility map corresponding to the sub-region, or a heatmap relating to access points in the sub-region.

21. The apparatus of claim 19 wherein the assistance data division module is further configured to generate sub-region information comprising at least one of vertex coordinates for respective ones of the sub-regions, size of the sub-regions, length of the sub-regions or width of the sub-regions and to associate the sub-region information with the plurality of sub-regions.

22. A mobile device configured to retrieve positioning assistance data, the mobile device comprising:
 a region manager configured to identify a master region in which the mobile device is located and sub-region definitions associated with the master region, wherein the sub-region definitions are indicative of area occupied by the sub-regions within the master region;
 an initial location estimate module configured to obtain information from at least one communication entity to determine a first estimated position of the mobile device, wherein the first estimated position of the mobile device is within the master region;
a horizon tile positioning module communicatively coupled to the initial location estimate module and configured to define a horizon tile comprising a first projected area centered at the first estimated position; and
an assistance data retrieval module communicatively coupled to the horizon tile positioning module and the region manager and configured to obtain first assistance data corresponding to at least one sub-region that overlaps the horizon tile.

23. The mobile device of claim 22 wherein the initial location estimate module is configured to measure signal strengths corresponding to access points (APs) within communication range of the mobile device, to designate an AP having a highest signal strength as a selected AP, and to set the first estimated position to a position of the selected AP.

24. The mobile device of claim 23 wherein the initial location estimate module is further configured to obtain an AP heatmap corresponding to the master region, to obtain a media access control (MAC) address of the selected AP, and to locate the position of the selected AP using the AP heatmap and the MAC address of the selected AP.

25. The mobile device of claim 22 further comprising a position tracking module communicatively coupled to the horizon tile positioning module and the assistance data retrieval module and configured to obtain a second estimated position of the mobile device based on the first estimated position of the mobile device and the first assistance data.

26. The mobile device of claim 25 wherein the horizon tile positioning module is further configured to reposition the horizon tile such that the horizon tile comprises a second projected area centered at the second estimated position, and wherein the assistance data retrieval module is further configured to obtain second assistance data corresponding to at least one sub-region that overlaps the horizon tile subsequent to the repositioning.

27. The mobile device of claim 22 wherein the assistance data retrieval module is configured to obtain the first assistance data from at least one of a storage medium of the mobile device or a positioning server.

28. An apparatus for managing positioning assistance data, the apparatus comprising:
means for obtaining assistance data relating to a master region, the assistance data comprising information relating to a set of nodes within the master region;
means for determining whether either a total size of the assistance data exceeds a mobile device operating capacity or a total count of nodes in the set of nodes exceeds an upper-bound number of nodes; and
means for dividing the master region into a plurality of sub-regions according to one or more criteria in response to determining that either the total size of the assistance data exceeds the mobile device operating capacity or the total count of nodes in the set of nodes exceeds the upper-bound number of nodes, wherein the means for dividing comprises means for dividing the master region into sub-region according to at least the one of an upper bound sub-region length, and upper bound number of access points per sub-region, or an upper bound number of anchor points per sub-region, or any combination thereof.

29. The apparatus of claim 28 wherein:
the means for obtaining assistance data comprises means for obtaining first assistance data comprising at least one of connectivity data for nodes in the master region, a utility map corresponding to the master region, or a heatmap relating to access points in the master region; and
the means for dividing comprises means for dividing the first assistance data into second assistance data for respective ones of the sub-regions, the second assistance comprising at least one of connectivity data for nodes in the sub-region, a utility map corresponding to the sub-region, or a heatmap relating to access points in the sub-region.

30. The apparatus of claim 28 further comprising:
means for generating sub-region information comprising at least one of vertex coordinates for respective ones of the sub-regions, size of the sub-regions, length of the sub-regions or width of the sub-regions; and
means for associating the sub-region information with the plurality of sub-regions.

31. A mobile device configured to retrieve positioning assistance data, the mobile device comprising:
means for identifying a master region in which the mobile device is located and sub-region definitions associated with the master region, wherein the sub-region definitions are indicative of area occupied by the sub-regions within the master region;
means for obtaining information from the at least one communication entity;
means for obtaining a first estimated position of the mobile device based on the information, wherein the first estimated position of the mobile device is within the master region;
means for defining a horizon tile comprising a first projected area centered at the first estimated position; and
means for obtaining first assistance data corresponding to at least one sub-region that overlaps the horizon tile.

32. The mobile device of claim 31 wherein the means for obtaining the first estimated position comprises:
means for measuring signal strengths corresponding to access points (APs) within communication range of the mobile device;
means for designating an AP having a highest signal strength as a selected AP; and
means for setting the first estimated position to a position of the selected AP.

33. The mobile device of claim 32 wherein the means for obtaining the first estimated position further comprises:
means for obtaining an AP heatmap corresponding to the master region; and
means for locating the selected AP using the AP heatmap.

34. The mobile device of claim 31 further comprising means for obtaining a second estimated position of the mobile device based on the first estimated position of the mobile device and the first assistance data.

35. The mobile device of claim 34 further comprising:
means for repositioning the horizon tile such that the horizon tile comprises a second projected area centered at the second estimated position; and
means for obtaining second assistance data corresponding to at least one sub-region that overlaps the horizon tile subsequent to the repositioning.

36. A computer program product residing on a processor-executable computer storage medium, the computer program product comprising processor-executable instructions configured to cause a processor to:
obtain assistance data relating to a master region, the assistance data comprising information relating to a set of nodes within the master region;

determine whether either a total size of the assistance data exceeds a mobile device operating capacity or a total count of nodes in the set of nodes exceeds an upper-bound number of nodes; and in response to determining that either the total size of the assistance data exceeds the mobile device operating capacity or the total count of nodes in the set of nodes exceeds the upper-bound number of nodes, divide the master region into a plurality of sub-regions according to one or more criteria, by identifying a number of sub-regions that the mobile device is configured to assemble, and configuring the sizes of the sub-regions such that a combined size of assistance data associated within the number of sub-regions the associated mobile device is configured to assemble does not exceed either the mobile device operating capacity or the upper-bound number of nodes.

37. The computer program product of claim 36 wherein the instructions configured to cause the computer to divide the master region are further configured to cause the processor to:
   identify a number of sub-regions a mobile device is configured to assemble; and
   configure a size of the sub-regions such that a combined size of assistance data associated with the number of sub-regions the mobile device is configured to assemble does not exceed the mobile device operating capacity.

38. The computer program product of claim 36 wherein the instructions configured to cause the computer to divide the master region are further configured to cause the processor to:
   identify a number of sub-regions a mobile device is configured to assemble; and
   configure a size of the sub-regions such that a combined number of nodes in the assistance data associated with the number of sub-regions the mobile device is configured to assemble does not exceed the upper-bound number of nodes.

39. The computer program product of claim 36 wherein the instructions configured to cause the computer to divide the master region are further configured to cause the processor to divide the master region according to at least one of an upper bound sub-region length, an upper bound number of access points per sub-region, or an upper bound number of anchor points per sub-region.

40. A computer program product residing on a processor-executable computer storage medium, the computer program product comprising processor-executable instructions configured to cause a processor to:
   identify a master region in which a mobile device is located and sub-region definitions associated with the master region, wherein the sub-region definitions are indicative of area occupied by the sub-regions within the master region;
   determine a first estimated position of the mobile device based on information obtained from at least one communication entity, wherein the first estimated position is within the master region;
   define a projected area centered at the first estimated position;
   compare the projected area to the master region and selecting at least one sub-region that overlaps the projected area; and
   obtain first assistance data corresponding to at least one sub-region that overlaps the projected area.

41. The computer program product of claim 40 wherein the instructions configured to cause the processor to obtain the first estimated position are further configured to cause the processor to:
   measure signal strengths corresponding to access points (APs) within communication range of the mobile device;
   designate an AP having a highest signal strength as a selected AP; and
   set the first estimated position to a position of the selected AP.

42. The computer program product of claim 40 further comprising instructions configured to cause the processor to obtain a second estimated position of the mobile device based on the first estimated position of the mobile device and the first assistance data.

43. The computer program product of claim 42 further comprising instructions configured to cause the processor to:
   reposition the projected area such that the projected area is centered at the second estimated position; and
   obtain second assistance data corresponding to at least one sub-region that overlaps the projected area subsequent to the repositioning.

44. An apparatus for managing positioning assistance data, the apparatus comprising: a processor configured to obtain assistance data relating to a master region, the assistance data comprising information relating to a set of nodes within the master region, to determine whether either a total size of the assistance data exceeds a mobile device operating capacity or a total count of nodes in the set of nodes exceeds an upper-bound number of nodes, and to divide the master region into a plurality of sub-regions according to one or more criteria in response to determining that either the total size of the assistance data exceeds the mobile device operating capacity or the total count of nodes in the set of nodes exceeds the upper-bound number of nodes, wherein the one or more criteria include an upper bound sub-region length, and upper bound number of access points per sub-region, or an upper bound number of anchor points per sub-region, or any combination thereof; and
   a memory coupled to the processor and configured for storing data.

45. An apparatus for retrieving positioning assistance data, the apparatus comprising:
   a processor configured to identify a master region in which the apparatus is located and sub-region definitions associated with the master region, wherein the sub-region definitions are indicative of area occupied by the sub-regions within the master region, to obtain a first estimated position of the apparatus within the master region based on a received signal strength indication (RSSI) of an access point (AP) within communication range of the apparatus, to define a projected area centered at the first estimated position, and to obtain first assistance data corresponding to at least one sub-region that overlaps the projected area; and a memory coupled to the processor and configured for storing data.

* * * * *